(12) United States Patent
Kawamura et al.

(10) Patent No.: US 7,671,510 B2
(45) Date of Patent: Mar. 2, 2010

(54) ULTRASONIC ACTUATOR, DRIVING METHOD OF THE ULTRASONIC ACTUATOR, LENS DRIVER, AND PORTABLE DEVICE

(75) Inventors: Hitoshi Kawamura, Ibaraki (JP); Keisuke Taguchi, Ibaraki (JP)

(73) Assignee: Hitachi Maxell, Ltd., Ibaraki-shi, Osaka (JP)

( * ) Notice: Subject to any disclaimer, the term of this patent is extended or adjusted under 35 U.S.C. 154(b) by 459 days.

(21) Appl. No.: 11/637,088

(22) Filed: Dec. 12, 2006

(65) Prior Publication Data
US 2007/0133968 A1    Jun. 14, 2007

(30) Foreign Application Priority Data

Dec. 13, 2005  (JP)  ............... 2005-359398
May 9, 2006    (JP)  ............... 2006-130231
Jun. 14, 2006  (JP)  ............... 2006-165237

(51) Int. Cl.
*H01L 41/09*    (2006.01)

(52) U.S. Cl. ................ 310/316.01; 310/317

(58) Field of Classification Search ............ 310/316.01, 310/317
See application file for complete search history.

(56) References Cited

U.S. PATENT DOCUMENTS 6,107,720  A  *  8/2000  Atsuta  ............... 310/316.01
6,819,027  B2 * 11/2004  Saraf   ............... 310/316.01

FOREIGN PATENT DOCUMENTS

| JP | 09-298890 A | 11/1997 |
| JP | 2002-303775 A | 10/2002 |
| JP | 2002-359988 A | 12/2002 |
| JP | 2003-033054 A | 1/2003 |

* cited by examiner

*Primary Examiner*—Thomas M Dougherty
(74) *Attorney, Agent, or Firm*—Birch, Stewart, Kolasch & Birch, LLP

(57) ABSTRACT

An ultrasonic actuator according to an embodiment of the present invention includes: a stator generating a rotational driving force in accordance with a driving signal having a train pulse, which is used, for example, an AF mechanism; and a rotor converting the rotational driving force into actual movement. In the thus-structured ultrasonic actuator of the present invention, the driving signal is obtained by removing a predetermined number of pulses from the pulse train upon deceleration, and the remaining number of consecutive pulses is set to at least 2 or 4 or more.

7 Claims, 17 Drawing Sheets

RELATED ART

RELATED ART

| | | THE NUMBER OF THINNED-OUT PULSES | | | | | | | | | | | | |
|---|---|---|---|---|---|---|---|---|---|---|---|---|---|---|
| | | 1 | 2 | 3 | 4 | 5 | 6 | 7 | 8 | 12 | 16 | 20 | 24 | 28 | 32 | 36 |
| THE NUMBER OF CONSECUTIVE PULSES | 1 | × | | | | | | | | | | | | | | |
| | 2 | ○(2/3) | ○(1/2) | ○(2/5) | △(1/3) | | | | | | | | | | | |
| | 3 | ○(3/4) | ○(3/5) | ○(1/2) | ○(3/7) | ○(3/8) | ○(1/3) | ○(3/10) | × | | | | | | | |
| | 4 | ○(4/5) | ○(2/3) | ○(4/7) | ○(1/2) | ○(4/9) | ○(2/5) | ○(4/11) | ○(1/3) | ○(1/4) | ○(1/5) | ○(1/6) | ○(1/7) | ○(1/8) | △(1/9) | △(1/10) |

Fig. 13

ULTRASONIC ACTUATOR, DRIVING METHOD OF THE ULTRASONIC ACTUATOR, LENS DRIVER, AND PORTABLE DEVICE

BACKGROUND OF THE INVENTION

1. Field of the Invention

The present invention relates to an ultrasonic actuator used in an autofocus (AF) mechanism incorporated in, for example, an optical device, and to a driving method of the ultrasonic actuator.

2. Description of Related Art

Existing cameras such as a film camera and a digital camera incorporate a lens driver for automatically driving a lens, and various kinds of lens drivers have been hitherto developed. FIG. 1 shows a conventional lens driver using a stepping motor.

As shown in FIG. 1, a conventional lens driver 900 has a zoom mechanism adjusting a focal distance (zoom factor) and an autofocus mechanism automatically adjusting the focus of a lens. These mechanisms are provided with stepping motors 901 and 902, and gears 903 and 904 are mounted to motor shafts of the stepping motors 901 and 902 respectively. The lenses 905 and 906 as a zoom lens and an autofocus lens incorporate gear holders 907 and 908, and gears 903 and 904 are fitted in these gear holders. In the conventional lens driver 900, the motors 901 and 902 of the zoom mechanism and the autofocus mechanism are rotated to drive the lenses 905 and 906. The lenses 905 and 906 are axially supported to a lens holding shaft 909.

Recent compact terminals such as a cell phone or a mobile terminal are equipped with a camera. Hence, there arises a need to downsize the camera, and a size and position of a motor of the lens driver are important factors in size reduction. The conventional lens driver using the stepping motor requires a pair of expensive stepping motors for both of the zoom mechanism and the autofocus mechanism. In addition, there is a limitation on size reduction of the stepping motor itself. From the viewpoint of component arrangement as well, size reduction in actuator is limited. If the components are arranged with intent to reduce a size, the number of components for transmitting a torque from the stepping motor increases, and each mechanism is complicated. Thus, the conventional lens driver using a stepping motor has limitations in size reduction as well as costs high.

To that end, from the purpose of downsizing the lens driver, there has been developed a lens driver using an ultrasonic actuator, not a stepping motor (see Japanese Unexamined Patent Publication No. 2003-33054, Japanese Unexamined Patent Publication No. 2002-303775, and Japanese Unexamined Patent Publication No. 9-298890, for instance). For example, a lens driver as disclosed in Japanese Unexamined Patent Publication No. 2003-33054 drives one lens using a single ultrasonic actuator. In contrast, plural lenses may be also individually driven by plural ultrasonic actuators. In this case as well, a pair of ultrasonic actuators are provided to both of the zoom mechanism and the autofocus mechanism similar to the lens driver using a pair of stepping motors. A lens driver using plural ultrasonic actuators is more expensive than a lens driver using a single ultrasonic actuator, similar to the lens driver using plural stepping motors, and its structure is complicated, so there is a limitation on size reduction.

Here, the ultrasonic actuator is an actuator based on a novel operating principle, not based on an electromagnetic operation as the conventional principle of driving the motor, and is used in a camera lens driver and a medical microactuator. A driving power source of the ultrasonic motor is a piezoelectric vibrator. There are two types of piezoelectric vibrators: a resonant type and a nonresonant type. The resonant type piezoelectric vibrator is used for the ultrasonic actuator of the present invention. There have been known two types of resonant type piezoelectric vibrators: a standing wave type the vibration node of which is not moved, and a traveling wave type the vibration node and loop of which are moved at sound velocity. These two types are based on one-dimensional reciprocating vibrations of a vibrator the gravity center of which is fixed. In addition, there have been utilized a standing wave vibrator that makes a two-dimensional reciprocating motion along the circumference of the cylindrical vibrator the gravity center of which is fixed, based on bending vibrations. Among these, the standing wave makes a reciprocating motion, not moves in one direction. The traveling wave moves in one direction, and can be utilized as a driving force. However, existing traveling wave vibrators are structured such that one of the original positive and negative phases of a standing wave is removed into a traveling wave, so its generation efficiency is low.

On the other hand, the piezoelectric actuator is a revolving resonator that can generate a reciprocal rotational torque at a single-phase alternating voltage, and save vibrating power Q times higher than excitation power (Q is larger than 1,000) and hold the power with as high efficiency as 99.9% or more. The revolving resonator is a torque resonator that means a resonator where electrostriction revolves, in other words, an element called a piezoelectric actuator which generates a torque with the highest efficiency. This element is mistaken for a kind of traveling wave vibrator in some cases. Upon resonance, the vibration loop makes one rotation every cycle along the circumference in sync with an excitation voltage, while the vibration node is not in a vibrating medium and revolves together with the center of gravity of the vibrator. Since the node is not moved, it cannot be of course regarded as a traveling wave, nor a wavemotion. It is, so to speak, a vortex. The vortex is a two-dimensional torque generated through rotation in a combined mode of a circumferential rotation mode and radial rotation mode. If having a cylindrical shape, the resonator is a three-dimensional resonator where an axial rotation mode can be readily combined with these two modes, so three-dimensional mode rotation occurs, and three-dimensional torque of various directions is generated on the entire surface of the piezoelectric actuator, as disclosed in the publication below. The revolving torque is generated with an asymmetric mode for applying voltages of opposite polarities between opposing electrodes A and C and between opposing electrodes B and D. As a result, the gravity center revolves around its center, and the outer circumference of a circle is eccentrically moves like a hula hoop. Then, the piezoelectric actuator moves on spiral trajectories. In this way, the revolving torque is generated.

Japanese Unexamined Patent Publication No. 2002-303775 discloses a structural example of the ultrasonic motor. FIG. 2 is a schematic perspective view of the ultrasonic motor as disclosed in Japanese Unexamined Patent Publication No. 2002-303775. The ultrasonic motor includes a cylindrical piezoelectric ceramic stator 11 and a ring-shaped rotor 12 that is brought into close contact with a rear edge of the stator. Four divided electrodes, electrodes 111, 112, 113, and 114, are formed on the outer peripheral surface of the cylindrical stator 11, and a common electrode (not shown) is formed throughout the inner peripheral surface.

As shown in a schematic diagram of FIG. 3A, alternating driving signals A, B, C, and D that are out of phase are applied to the electrodes 111, 112, 113, and 114. Further, the inner-peripheral-surface electrode of the cylindrical stator 11 is kept at a floating or ground potential (midpoint potential) As shown in FIGS. 3A and 3B, there is a phase shift of 90 degrees between the driving signals A and B, B and C, C and D, and D and A. Accordingly, there is a phase shift of 180 degrees between the driving signal A and the driving signal C and between the driving signal B and the driving signal D. If excited with the voltage asymmetrical with respect to the axis of the cylinder, every portion of the piezoelectric element would expand and contract in accordance with a corresponding voltage level. However, circumferential force acts in adjacent portions, resulting in occurrence of rotation in a combined mode of a radial rotation mode and a circumferential rotation mode. This causes spiral movement. If such spiral movement occurs, resonant phenomenon that the center of gravity moves around its center occurs, and the turning radius is resonance-amplified. In this way, the piezoelectric actuator can directly excite rotation, and strong revolving torque is uniformly generated in the peripheral surface. As for a cylindrical stator, a torque is generated throughout the entire surface, and strong revolving torque perpendicular to the diameter is generated especially at the end surface. The rotational torque can be directly turned into the rotational force of the rotor 12 that is brought into pressure contact with the stator 11.

Referring now to a graph of FIG. 5, a relation between a load current and a drive frequency in an example of the conventional ultrasonic motor is described. If a frequency is decreased from a rotation stop point higher than a resonance frequency of the piezoelectric actuator (piezoelectric element) of the stator 11, the load current is maximized at a predetermined frequency. At this time, the largest torque is obtained. If the frequency is a little lowered from the frequency where the load current is maximized, the ultrasonic motor reaches a resonance step-out point, with the result that the load current abruptly decreases to stop the rotation. Next, in the case of increasing the frequency from the step-out point up to a resonance demodulation point, the load current abruptly increases to resume the rotation. If further increased, the frequency reaches a stop point. It is a feature of non-linear resonance that the step-out point and the demodulation point are not at the same frequency level, the history of change is obtained through frequency sweep, and a current jump phenomenon occurs.

To elaborate, as shown in FIG. 6, in the case of increasing a frequency from a lower level, the ultrasonic motor is kept at rest at a frequency lower than the resonance frequency (recovery frequency). The ultrasonic motor rotates if the frequency exceeds the recovery frequency. The ultrasonic motor stops rotating if the frequency reaches the rotation stop point. In contrast, in the case of decreasing the frequency from a higher level, the ultrasonic motor does not stop rotation even at the frequency beyond the recovery frequency, and stops at the step-out point.

To that end, a resonance frequency of the piezoelectric actuator and a current amount are measured beforehand, and an appropriate driving signal is input to the piezoelectric actuator based on the data. As shown in FIG. 7, operating characteristics of the ultrasonic motor are such that the resonance frequency f0 is shifted to the frequency f1 or f2 due to various factors such as heat generated upon motor driving. Therefore, an amount of current flowing through the piezoelectric actuator at a predetermined frequency is changed, so even if driving signals of constant frequency are input all the time, it is difficult to keep a stationary state. To overcome this problem, reported is a method of feeding back a drive current from the ultrasonic motor, controlling a frequency of the driving signal to an appropriate level, and keeping the maximum current (peak current) (see Japanese Unexamined Patent Publication No. 2002-359988, for instance).

Further, even if a feed-back control on a frequency of the driving signal is executed, the ultrasonic motor has nonlinear characteristics, so there is a fear that the frequency reaches the step-out point to stop the motor rotation. Thus, the ultrasonic motor can be driven while kept in a stable state for a certain amount of time but can be hardly driven while kept in a stable state for a long period. Further, a resonance frequency slightly varies among piezoelectric actuators, so it is difficult to set a single resonance frequency that enables stable operations of many piezoelectric actuators. Furthermore, the piezoelectric actuator has hysteresis characteristic. Therefore, if the same piezoelectric actuators are used, the resonance frequency is changed.

As described above, a frequency history band from the step-out point to the demodulation point is an unstable range as shown in FIG. 5, and is inappropriate as a drive area. A frequency band from the demodulation point to the stop point is appropriate for driving. The frequency history band is unique to a nonlinear resonator in which as resonance amplitude increases to some degrees, saturation phenomenon suddenly occurs, Q drops, and a heat loss occurs. Therefore, the bandwidth varies depending on a frequency sweep speed. On the other hand, the demodulation point is a frequency where the ultrasonic motor returns from a non-oscillation state, that is, a non-heat-generating state to a resonant state, so stable frequency measurement values can be easily obtained. In practice, if the ultrasonic motor is excited to keep a resonant state with a constant frequency around the demodulation point, the resonance frequency is shifted to a higher band due to heat generation, and an exciting frequency is shifted to a history band lower than the demodulation frequency. Finally, the loss of synchronism occurs, and heat generation is stopped. If the ultrasonic actuator is held in this state for a predetermined period, the demodulation frequency corresponds to the exciting frequency due to temperature drop resulting from heat radiation. Then, the ultrasonic actuator jumps to the resonant state. If the exciting frequency is adjusted, a frequency where a jump to the loss of synchronism/demodulation is repeated at regular intervals is found. This frequency is a lower limit of a stable drive area, and a band from the lower limit to the stop point is the stable drive area.

The thus-structured ultrasonic motor has a function of a high-definition stepping motor. In order to obtain various actuators using this motor, it is necessary to lower the motor rpm, that is, decelerate the motor without impairing the high mobility. As conceivable measures for reducing the motor rpm, there is a method of reducing the rpm using a gear or the like in a motor mechanism. However, this method involves a fear that the high mobility is impaired, and the size is increased because of its structure. In particular, this method is insufficient for an application that requires size reduction and high definition, such as an AF actuator.

Further, as conceivable methods of electrically reducing the motor rpm, there is a method of changing the driving signal. However, nonlinearity is high, so a linear response cannot be expected, and controllability is low. For reducing the rpm under constant voltage conditions, there is a method of shifting a driving signal frequency to a lower level in a drive frequency range. This method shifts a frequency to a higher level to reduce a vibration energy generated in the piezoelectric element to reduce an energy transmitted to the rotor to thereby reduce the motor rpm, and thus involves a problem in that a drive torque as well as the rpm reduces along with the reduction in transmitted energy, and it is impossible to change only the rpm under constant output torque conditions.

SUMMARY OF THE INVENTION

The present invention has been accomplished with a view to solving the aforementioned problems, and an object of the invention is to provide an ultrasonic actuator that enables deceleration under constant output torque conditions without using a complicated mechanism, and a driving method of the ultrasonic actuator.

An ultrasonic actuator according to an aspect of the present invention includes: a stator generating a rotational driving force in accordance with a driving signal having consecutive pulses; and a movable element converting the rotational driving force into actual movement, the driving signal being generated by being removed a predetermined number of pulses of the consecutive pulses upon a decelerated operation at a speed lower than a general operational speed.

Here, for obtaining the driving signal upon the decelerated operation, a duty ratio may be changed using a burst wave, and the decelerated operation is realized within a large frequency range. However, according to such analog technique, the duty ratio is increased. If the remaining number of waves decreases down to several ten cycles or less, an operation becomes unstable and then is stopped. Therefore, the minimum number of cycles required for stable operations increases, with the result that operational resolution lowers along with the increase in the number of cycles, and a characteristic high-definition operation is impaired. Thus, from the analog concept that the duty ratio is changed using the burst wave, a method of moving a movable element by steps corresponding to the number of pulses is adopted. At this time, if the element moves by one step with one pulse, the high-definition operation of the highest sensitivity can be attained. However, a resonant state cannot be obtained with one pulse due to saturation characteristics of the piezoelectric actuator, so at least 2 pulses are necessary. Accordingly, it is preferred to set a pulse train where a predetermined number of pulses are removed after every two or more consecutive pulses.

An ultrasonic actuator according to another aspect of the invention includes: a stator generating a rotational driving force in accordance with a driving signal having consecutive pulses; and a movable element converting the rotational driving force into actual movement. The stator includes a cylindrical piezoelectric actuator having four electrodes A, B, C, and D divided along an outer circumference, the driving signal includes four channel signals differentiated each other by 90 degrees, voltages of opposite polarities are applied between the opposite electrodes A and C and the opposite electrodes B and D, a predetermined number of pulses are thinned out in the pulse train of at least one of the four channel driving signals, and the signals are used for driving upon deceleration at a speed lower than a normal operation speed.

In general, the driving signal used for that purpose is based on a concept of a burst-wave signal in an analog circuit, and a reducing ratio can be changed by changing a duty ratio. If the duty ratio is large, and substantially continuous wave is obtained, the speed can be well reduced. However, if the duty ratio is decreased for further reducing the speed, an operation of a movable element is unstable. If the number of remaining consecutive pulses is several ten pulses, the operation is stopped. In the present invention, from a digital control concept that control is executed with a varying number of pulses of digital signals, the actuator is driven under a single pulse condition, the number of consecutive pulses is small, and an amount of generated heat is small, with the result that a temperature rise of an element, which would affect operating characteristics, can be avoided as much as possible, and deceleration can be carried out with a stable operation.

In the ultrasonic actuator according to the present invention, it is preferred that the driving signal generated upon the deceleration have a structure where a predetermined number of pulses are removed after every two or more consecutive pulses.

Further, it is desirable that the driving signal have a structure where a predetermined number of pulses are removed after every four or more consecutive pulses upon deceleration at a large reducing ratio.

An autofocus mechanism can be obtained by using the ultrasonic actuator.

According to another aspect of the invention, a driving method of an ultrasonic actuator including a stator generating a rotational driving force in accordance with a driving signal having consecutive pulses, and a movable element converting the rotational driving force into actual movement, includes: generating the driving signal by being removed a predetermined number of pulses of the consecutive pulses upon a decelerated operation at a speed lower than a general operational speed; and driving the ultrasonic actuator with the driving signal.

According to another aspect of the invention, a driving method of an ultrasonic actuator including a stator generating a rotational driving force in accordance with a driving signal having consecutive pulses, and a movable element converting the rotational driving force into actual movement. The stator includes a cylindrical piezoelectric actuator having four electrodes A, B, C, and D divided along an outer circumference, the driving signal includes four channel signals differentiated each other by 90 degrees, voltages of opposite polarities are applied between the opposite electrodes A and C and the opposite electrodes B and D, a predetermined number of pulses are removed in the pulse train of at least one of the four channel driving signals, and the signals are used for driving upon deceleration at a speed lower than a normal operation speed.

According to another aspect of the invention, a driver for driving an ultrasonic actuator including a piezoelectric actuator including a piezoelectric element and generating a driving force in accordance with a driving signal having consecutive pulses, and a movable element converting the driving force into actual movement, includes: a memory storing a driving start frequency at which driving of the piezoelectric actuator is started; a current detecting unit detecting a current flowing through the piezoelectric actuator; and a control unit controlling a frequency of a driving signal input to the piezoelectric actuator, the control unit controlling a frequency of the driving signal in accordance with the current detected with the current detecting unit in a frequency band equal to or higher than the driving start frequency. With such structure, the piezoelectric actuator can be driven with a driving signal at a driving start frequency where a peak current can be obtained, so the actuator can be stably driven for a long period without reaching a stop point and involving loss of synchronism.

Further, the control unit increases a frequency of the driving signal input to the piezoelectric actuator if an amount of the detected current increases, and decreases the frequency of the driving signal input to the piezoelectric actuator if an amount of the detected current decreases.

Further, the control unit inputs a driving signal to the piezoelectric actuator while increasing a frequency of the driving signal upon power-on of the ultrasonic actuator, and stores the driving start frequency at which driving of the piezoelectric actuator is started in the memory.

An ultrasonic actuator according to another aspect of the present invention is driven by the driver. With this structure, the piezoelectric actuator can be driven with a driving signal at a driving start frequency where a peak current can be obtained, so the actuator can be stably driven for a long period without reaching a stop point and involving loss of synchronism.

According to another aspect of the invention, a driving method of an ultrasonic actuator including a piezoelectric actuator including a piezoelectric element and generating a driving force in accordance with a driving signal having consecutive pulses, and a movable element converting the driving force into actual movement, includes: storing a driving start frequency at which driving of the piezoelectric actuator is started; detecting a current flowing through the piezoelectric actuator; and controlling a frequency of the driving signal in accordance with the detected current at a frequency band equal to or higher than the driving start frequency. According to this method, the piezoelectric actuator can be driven with a driving signal at a driving start frequency where a peak current can be obtained, so the actuator can be stably driven for a long period without reaching a stop point and involving loss of synchronism.

Further, the controlling of the frequency of the driving signal includes: increasing a frequency of the driving signal input to the piezoelectric actuator if an amount of the detected current increase; and decreasing a frequency of the driving signal input to the piezoelectric actuator if an amount of the detected current decrease.

Further, according to another aspect of the invention, the driving method of an ultrasonic actuator further includes: turning on the ultrasonic actuator; inputting a driving signal to the piezoelectric actuator upon the power-on while increasing a frequency of the driving signal; and storing the driving start frequency at which driving of the piezoelectric actuator is started. Hence, it is possible to drive a piezoelectric actuator including a piezoelectric element at a driving start frequency in accordance with an initial state of the actuator upon power-on.

According to another aspect of the invention, an ultrasonic actuator capable of moving two members includes: a piezoelectric element having a cylindrical shape extending along a direction in which the two members are arranged, and generating a rotational driving force for moving the two members; two rotors slidably brought into pressure contact with end surfaces of the cylindrical shape of the piezoelectric element and rotated in accordance with the rotational driving force; and two brakes braking rotation of the two rotors, the two members being displaced and driven in accordance with the rotation of the rotors.

With such structure, two members can be moved by using one piezoelectric element, so an inexpensive actuator can be realized. Further, two members and two rotors holding the members are arranged at both ends of the piezoelectric element and can be downsized to a size of the piezoelectric element. Therefore, it is possible to realize a compact and inexpensive ultrasonic actuator.

Further, the two brakes cancel or keep a state of contacting with the rotors in accordance with operations of the two members.

Further, a brake in contact with the rotor holding one of the two members, which is driven cancels the contact state, and a brake in contact with the rotor holding the other member that is not driven keeps the contact state.

Preferably, the rotors are brought into pressure contact with end surfaces of the piezoelectric element rotatably about an axis in a longitudinal direction of the piezoelectric element, and the members are held spirally about the axis in the longitudinal direction of the piezoelectric element by the rotors.

Further, the members are fitted into the piezoelectric element from the end surfaces.

Further, the two members are fitted opposite to each other in the cylindrical piezoelectric element.

Preferably, the ultrasonic actuator further includes: a bearing pressing the two rotors against both end surfaces of the piezoelectric element; and an elastic member pressing the bearing against the rotors.

A lens driver according to the present invention includes two members as lens units driven with the ultrasonic actuator. This structure enables a compact and inexpensive lens driver.

Further, the lens driver further includes: an additional lens unit different from the two lens units, wherein one of the two lens units adjusts a focal distance from the additional lens unit, and the other lens unit adjusts a focus of the additional lens unit.

The portable device according to the present invention includes two lens units and lens drivers. Even such structure enables a compact and inexpensive lens driver.

Further, the portable device further includes: a control unit controlling the piezoelectric element and the two brakes, the control unit canceling or keeping a state of the two brakes in contact with the rotor in accordance with operations of the two lens units.

Further, the control unit cancels a state of the brake in contact with the rotor holding one of the lens units, which is driven, and keeps a state of the brake in contact with the rotor holding the other lens unit that is not driven.

According to the present invention, it is possible to provide an ultrasonic actuator that enables high-definition deceleration under constant output torque conditions without using a complicated mechanism, and a driving method of the ultrasonic actuator.

The above and other objects, features and advantages of the present invention will become more fully understood from the detailed description given hereinbelow and the accompanying drawings which are given by way of illustration only, and thus are not to be considered as limiting the present invention.

BRIEF DESCRIPTION OF THE DRAWINGS

The above and other objects, advantages and features of the present invention will be more apparent from the following description taken in conjunction with the accompanying drawings, in which:

FIG. 13 is a table of driving signals for driving the ultrasonic motor of the first embodiment, which summarizes rotational operations with varying numbers of consecutive drive pulses and thinned pulses;

DESCRIPTION OF THE PREFERRED EMBODIMENTS

The invention will be now described herein with reference to illustrative embodiments. Those skilled in the art will recognize that many alternative embodiments can be accomplished using the teachings of the present invention and that the invention is not limited to the embodiments illustrated for explanatory purposed.

First Embodiment

Figure 1:
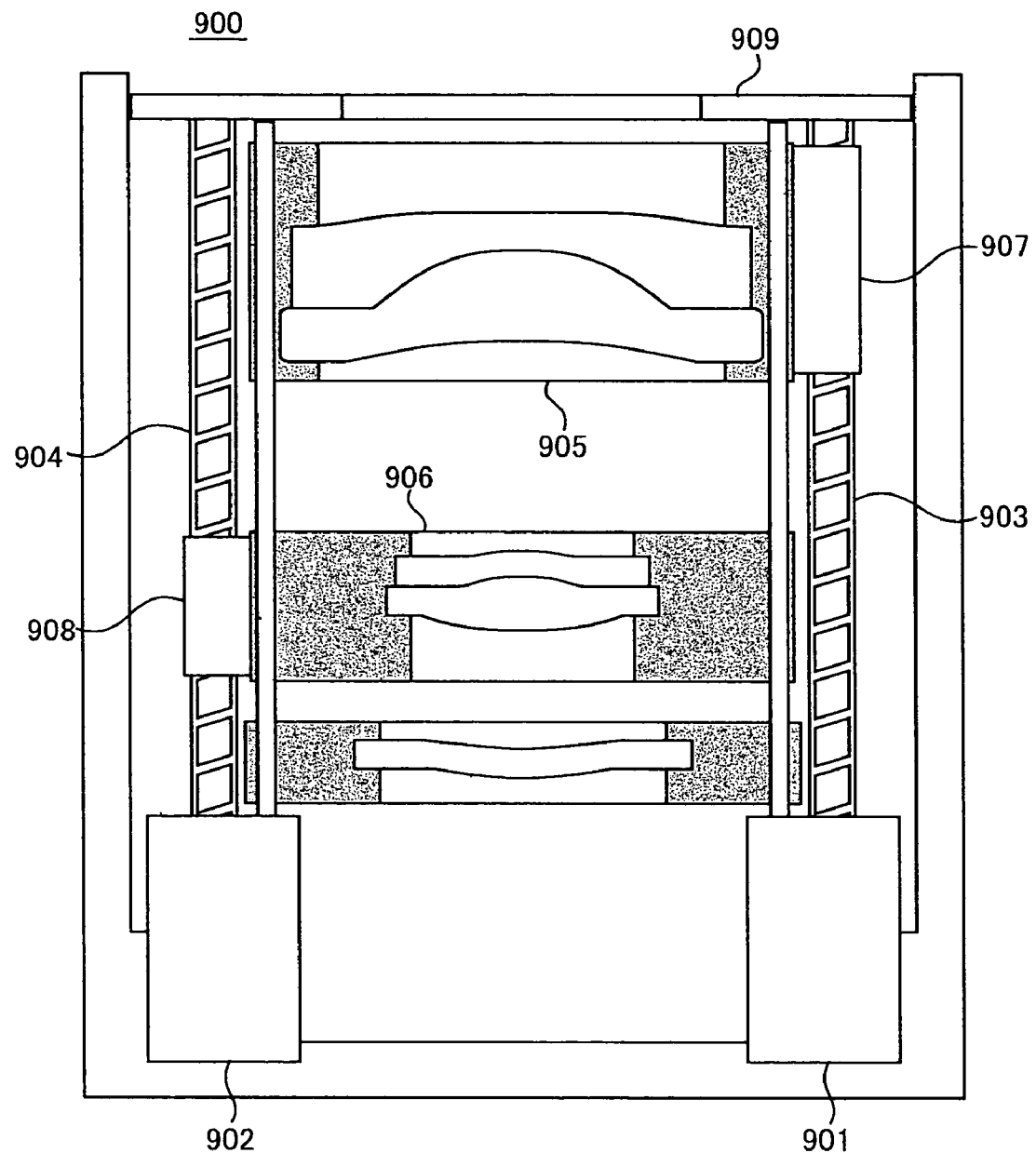
FIG. 1 is a sectional view of a structural example of a lens drive of the related art.
Figure 2:
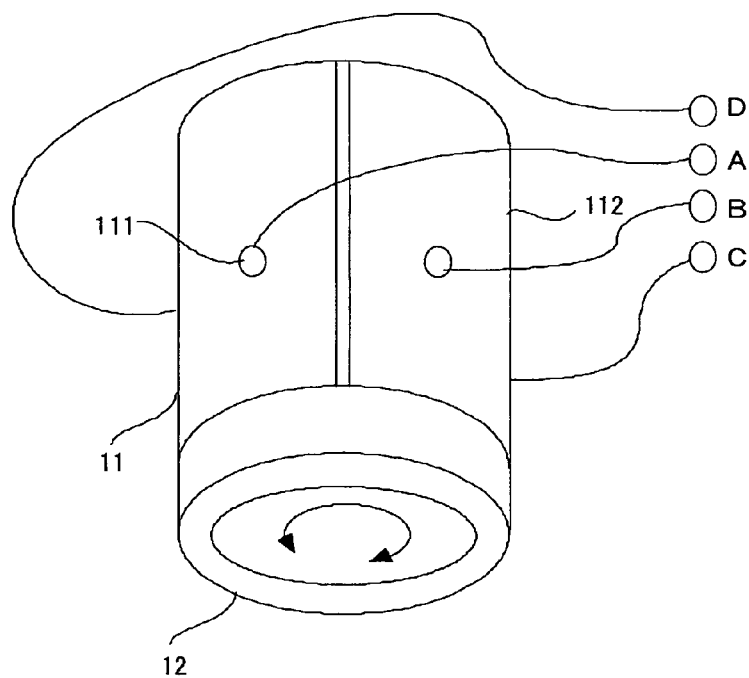
FIG. 2 is a schematic perspective view of an ultrasonic motor of the related art.
Figure 3A:
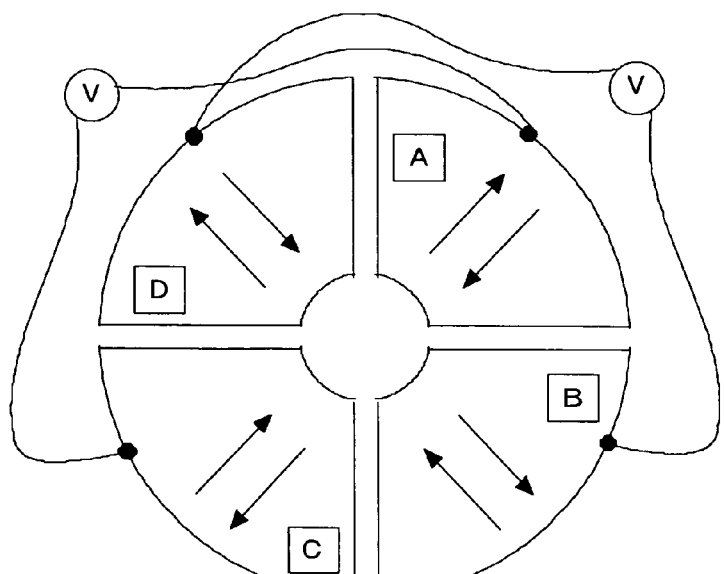
FIGS. 3A and 3B are a top view and a side view of a stator of an ultrasonic motor of the related art.
Figure 3B:
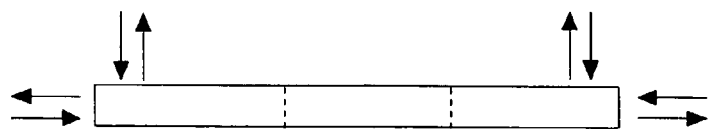

A basic structure of an ultrasonic actuator according to a first embodiment of the present invention is the same as that of a conventional ultrasonic motor as shown in FIG. 2 and FIGS. 3A and 3B. A feature of the ultrasonic actuator of this embodiment resides in a driving signal.

Figure 8:
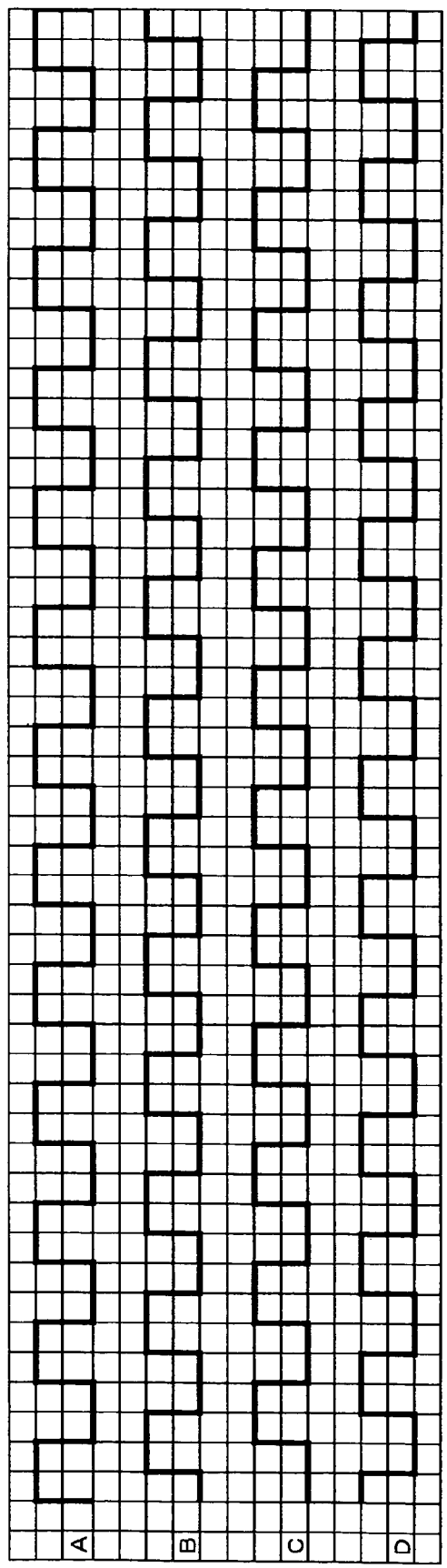
FIG. 8 is a waveform diagram of driving signals for driving an ultrasonic motor according to a first embodiment of the present invention.

FIG. 8 is a signal waveform diagram of driving signals (hereinafter referred to as "reference driving signals") for rotating the ultrasonic motor at a normal speed, that is, at a non-decreased speed. As shown in FIG. 8, at the normal speed, four-phase pulse driving signals A, B, C, and D are applied to electrodes 111, 112, 113, and 114 of the ultrasonic motor respectively. The driving signals A, B, C, and D each includes plural pulse trains and have a fixed frequency determined based on a resonance point of a piezoelectric element. A pulse width and pulse voltage of each pulse in each driving signal are constant. As described in the related art, a rotor 12 is brought into close contact with an upper surface of a stator 11 to transmit vibration energy generated with the driving signal to the rotor 12 and rotate the rotor 12. As shown in FIG. 8, the driving signals A, B, C, and D that are out of phase by 90° are applied to the electrodes 111, 112, 113, and 114, and driving signals opposite in phase are applied to electrodes diagonally opposite to each other in the element, so the vibration energy is turned to a traveling wave that travels in a rotational direction. The rotor 12 is rotated in step with the traveling wave.

Figure 9:
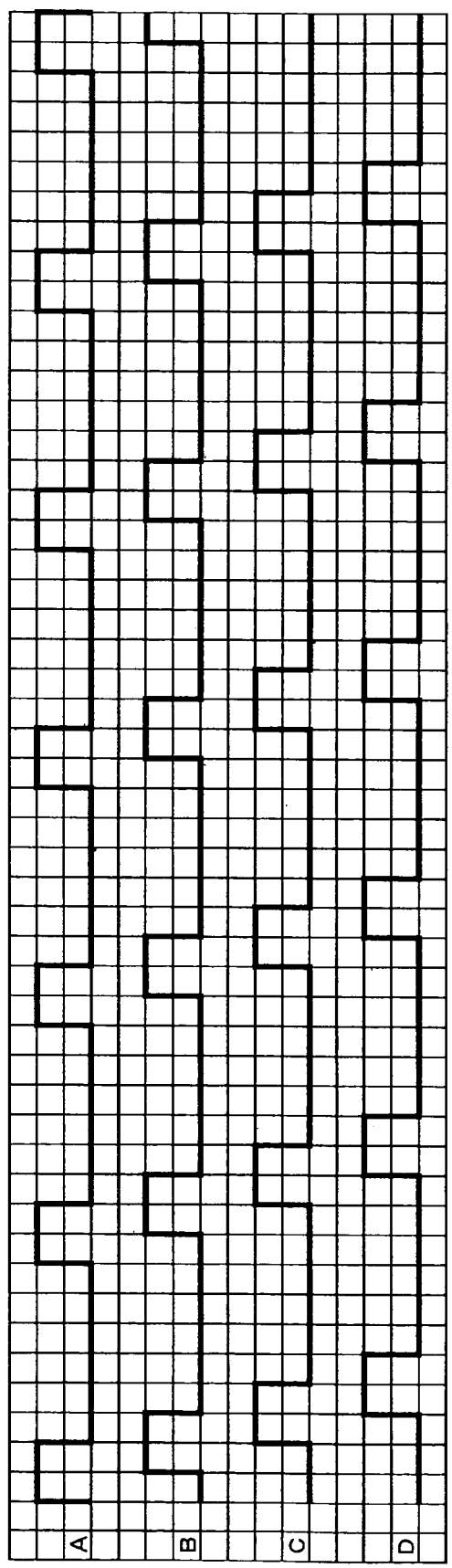
FIG. 9 is a waveform diagram of driving signals for driving the ultrasonic motor of the first embodiment.

Regarding a driving signal for rotating the ultrasonic motor at a speed lower than the normal speed, as shown in a signal waveform diagram of FIG. 9, signal pulses may be alternately taken out. Although it is necessary to apply signals opposite in phase, which are 180° out of phase, to electrodes diagonally opposite to each other in the element in the ultrasonic motor, the above driving method cannot meet this condition, the traveling wave is insufficient, and the rotor cannot be rotated.

Figure 10:
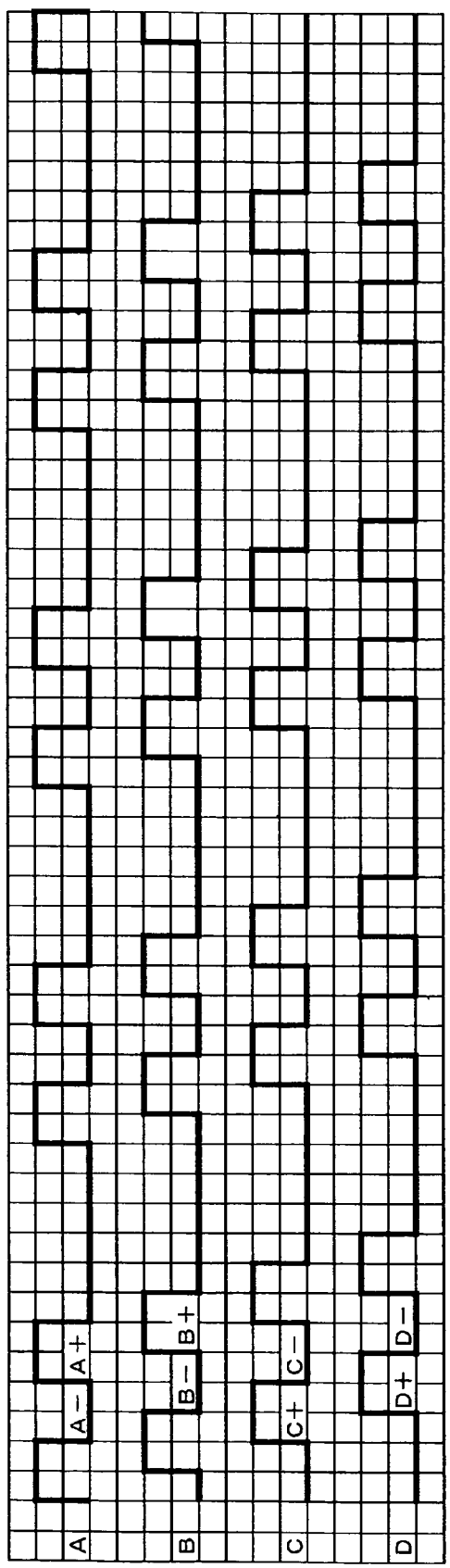
FIG. 10 is a waveform diagram of driving signals for driving the ultrasonic motor of the first embodiment.

To that end, as shown in a signal waveform diagram of FIG. 10, the inventors of this application adopt such a signal waveform that pulses of each of the driving signals A, B, C, and D are thinned out one at a time at intervals of two pulses. A pulse form of the pulses in each driving signal of this example is the same as that of the reference driving signal. In other words, a pulse width and pulse voltage of the pulses in each driving signal of this example are the same as those of the reference driving signal. Further, a repetition frequency of the pulses in each driving signal is the same as that of the reference driving signal, but some pulses are not generated, that is, are thinned out.

If such driving signals are applied to the ultrasonic motor, it is possible to satisfy conditions that opposite-phase signals that are 180° out of phase are applied to electrodes diagonally opposite to each other in the element; for example, if the driving signal A has a negative polarity, the driving signal C has a positive polarity, and if the driving signal A has a positive polarity, the driving signal C has a negative polarity. The motor can be decelerated with stable rpm.

Figure 11:
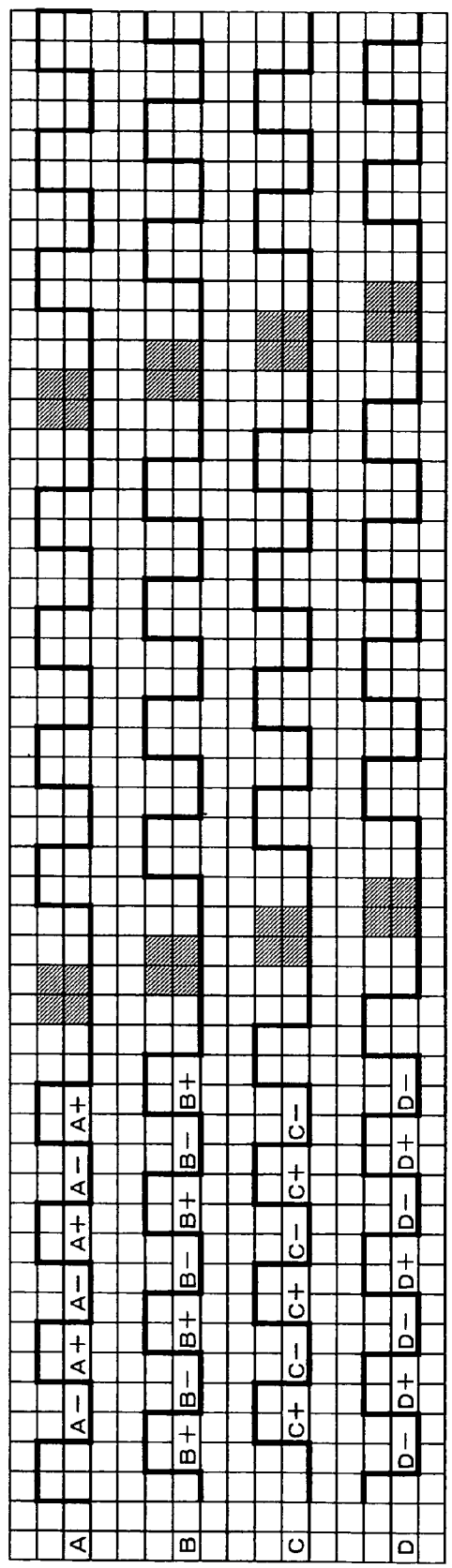
FIG. 11 is a waveform diagram of driving signals for driving the ultrasonic motor of the first embodiment.

As shown in FIG. 11, it is also possible to decelerate the motor with a driving signal pulses of which are thinned out one at a time at intervals of 4 pulses, at stable rpm. Incidentally, shaded portions of FIG. 11 correspond to the thinned pulses.

Figure 12:
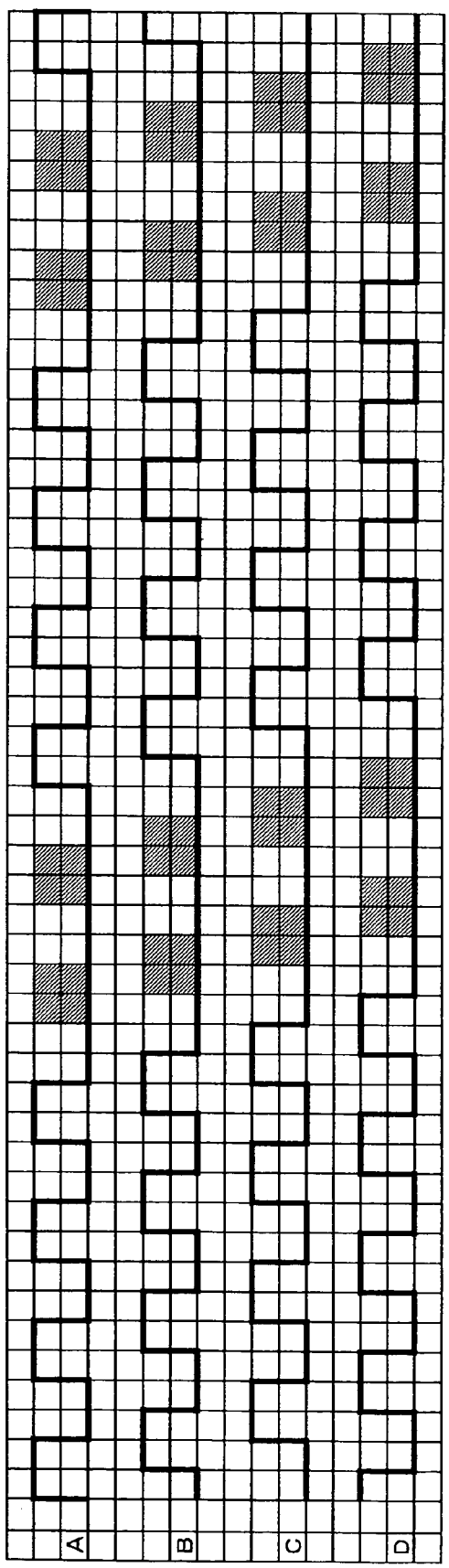
FIG. 12 is a waveform diagram of driving signals for driving the ultrasonic motor of the first embodiment.

As shown in FIG. 12, the motor can be also decelerated with stable rpm by use of a driving signal where two pulses are removed after every four pulses.

FIG. 13 is a table summarizing rotational operations with varying numbers of consecutive drive pulses and thinned pulses. In the table, x represents the case where the motor is not rotated, Δ represents the case where the motor operation is unstable although the motor is rotated, and ○ represents the case where the motor operation is satisfactory. In the case where the number of consecutive pulses is 1, and the number of thinned pulse is 1 as shown in FIG. 9, the motor was not rotated. In the case where the number of consecutive pulses is 2, and the number of thinned pulse is 1 or 2, the motor operation was satisfactory. However, in the case where the number of consecutive pulses is 2, and the number of thinned pulse is 3 or 4, the motor operation was unstable although the motor rotated. In the case where the number of consecutive pulses is 2, and the number of thinned pulse is 5, the motor did not rotate. In the case where the number of consecutive pulses is 3, and the number of thinned pulse is 1 to 6, the motor operation was satisfactory. However, in the case where the number of consecutive pulses is 3, and the number of thinned pulse is 7, the motor operation was unstable although the motor rotated. In the case where the number of consecutive pulses is 3, and the number of thinned pulse is 8, the motor did not rotate. In the case where the number of consecutive pulses is 4, and the number of thinned pulse is 1 to 28, the motor operation was satisfactory. However, in the case where the number of consecutive pulses is 4, and the number of thinned pulse is 32 or 36, the motor operation was unstable although the motor rotated. Incidentally, the case where the number of consecutive pulses is 4, and the number of thinned pulse is 37 or more was not examined.

As described above, according to the ultrasonic motor of this embodiment, it is unnecessary to adopt a complicated decelerating mechanism for reducing the motor rpm. Thus, the motor is compact and inexpensive. Further, the ultrasonic motor is driven with a driving signal where a predetermined number of pulses are removed after every two or more pulses. Hence, stable rotation at reduced speed is realized.

Wave components of the ultrasonic actuator of this embodiment are basically the same as the general ultrasonic motor as described above. The ultrasonic actuator of this embodiment and the general ultrasonic motor differ only in that the motor has not only a function of the general motor where the rotor torque is applied and used as driving force for rotating the motor as it is but also a function of a linearly moving driver where a lens barrel structured such that a screw is provided on, for example, the inner peripheral surface of a rotor and a male screw engaged with the screw is provided to the outer peripheral surface thereof is inserted and moved in the optical axis direction. As understood from this, the ultrasonic actuator according to the present invention can be used in various fields such as a camera lens driver, a rotating device of a monitoring camera, and a medical microactuator. To be specific, the camera lens driver is an AF mechanism or zoom actuator of a general digital camera or a digital camera incorporated in a cell phone. Incidentally, in the case where the ultrasonic actuator of this embodiment is used for the AF function, for example, the structure as disclosed in, for example, Japanese Unexamined Patent Publication No. 2002-303775 can be adopted. A piezoelectric element used in the ultrasonic actuator is relatively inexpensive, so it is possible to reduce a cost of the AF mechanism. Further, the ultrasonic actuator does not generate an interfering wave such as an electromagnetic wave and thus can be applied to a medical microactuator or medical compact camera.

Second Embodiment

A driver of an ultrasonic actuator according to a second embodiment of the present invention drives the ultrasonic actuator while the largest drive current amount for the piezoelectric actuator of the stator 11 is kept within a frequency range higher than a resonance frequency (demodulation frequency) at which driving is started. To be specific, the driver gradually raises a frequency of a driving signal to the demodulation frequency to start driving the ultrasonic actuator and drives the ultrasonic actuator within a frequency range higher than the demodulation frequency.

This embodiment describes a piezoelectric motor as a preferred example of the ultrasonic actuator. However, the present invention is not limited thereto, and various actuators can be obtained by changing a mechanism of transmitting driving force.

Figure 14:
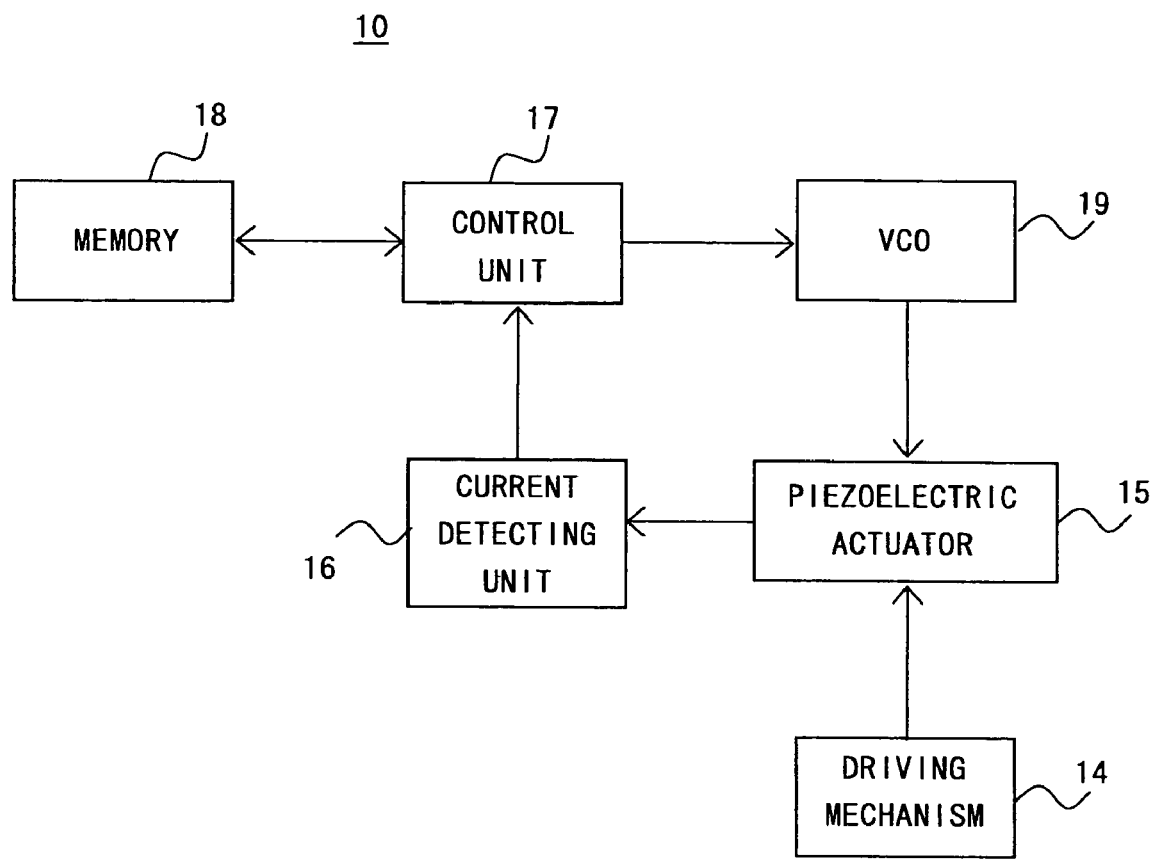
FIG. 14 is a block diagram of a structural example of a driver of a piezoelectric motor according to a second embodiment of the present invention.

Referring to FIG. 14, the structure of a driver of piezoelectric motor of this embodiment is described first. FIG. 14 is a block diagram of a structural example of the driver of the piezoelectric motor of this embodiment.

As shown in FIG. 14, a driver 10 of the piezoelectric motor of this embodiment includes a driving mechanism 14, a piezoelectric actuator 15, a current detecting unit 16, a control unit 17, a memory 18, and a voltage-controlled oscillator 19 (hereinafter abbreviated to "VCO 19").

The driving mechanism 14 is a driving mechanism for driving the piezoelectric motor, which is similar to the first embodiment and the related art as shown in FIGS. 2 and 3. Thus, its description is omitted here. The piezoelectric actuator 15 is made up of a so-called piezoelectric element that expands and contracts in response to input driving signals to generate driving force of the piezoelectric motor. The current detecting unit 16 is made up of an ammeter to detect a current flowing through the driven piezoelectric actuator 15. The control unit 17 is made up of a CPU or MPU to control operations of the driver 10.

The memory 18 includes a ROM or RAM and a hard disk drive, and stores various programs and data necessary for various processings for driving the piezoelectric motor. The memory 18 stores a demodulation frequency of a driving signal for driving the piezoelectric actuator 15. Further, the memory 18 further stores, for example, data about a current value of current flowing through the piezoelectric actuator 15, and a control program for controlling a driving signal based on a frequency or current value of the driving signal. The VCO 19 is an example of a driving signal generating unit for generating driving signals for driving the piezoelectric actuator 15, and changes a frequency of the driving signal in accordance with an input voltage to output the driving signal.

In the driver 10, when the driving mechanism 14 drives the piezoelectric actuator 15, the current detecting unit 16 detects a current flowing through the piezoelectric actuator 15. A current value of the current detected with the current detecting unit 16 is input to the control unit 17, and the control unit 17 stores the input current value in the memory 18. The control unit 17 derives a voltage value for controlling the VCO 19 from the current value, and inputs a voltage of the voltage value to the VCO 19. Here, the control unit 17 calculates a voltage value for controlling the VCO 19 based on a frequency of the driving signal input to the piezoelectric actuator 15.

The VCO 19 inputs a driving signal of a predetermined frequency to the piezoelectric actuator 15 based on the input voltage to drive the piezoelectric actuator 15. The driver 10 feeds back the current flowing through the piezoelectric actuator 15 to repeatedly control the piezoelectric actuator 15 during a period up to the driving of the piezoelectric actuator 15 and a period where the piezoelectric actuator 15 is being driven. Incidentally, these functional parts are driven by being supplied with power from a power supply unit for driving the piezoelectric motor although not shown. The driving signal supplied to the piezoelectric actuator 15 is similar to that of the first embodiment, so its description is omitted here.

Figure 15:
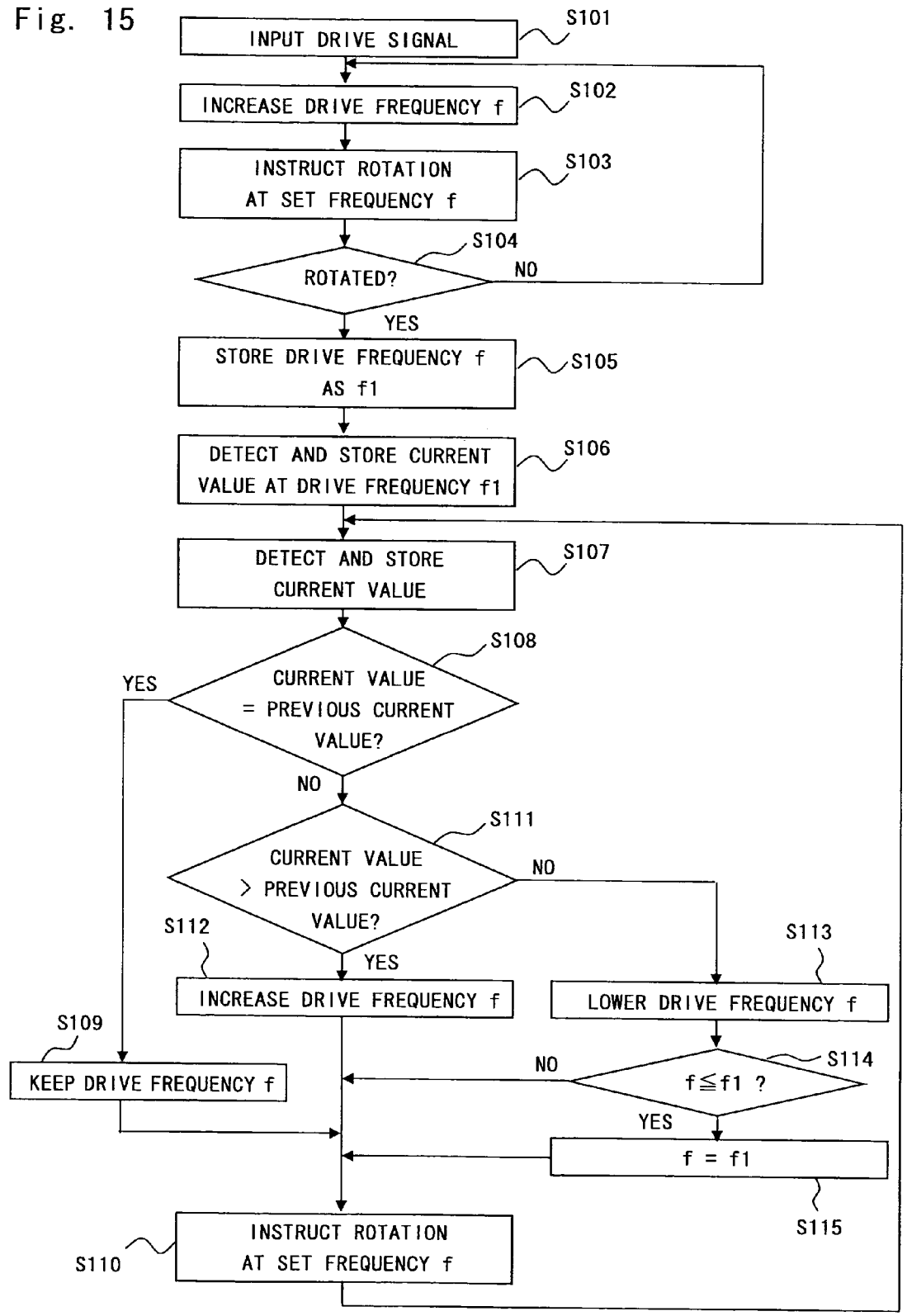
FIG. 15 is a flowchart of an operational example of the driver of the piezoelectric motor of the second embodiment.
Figure 16A:
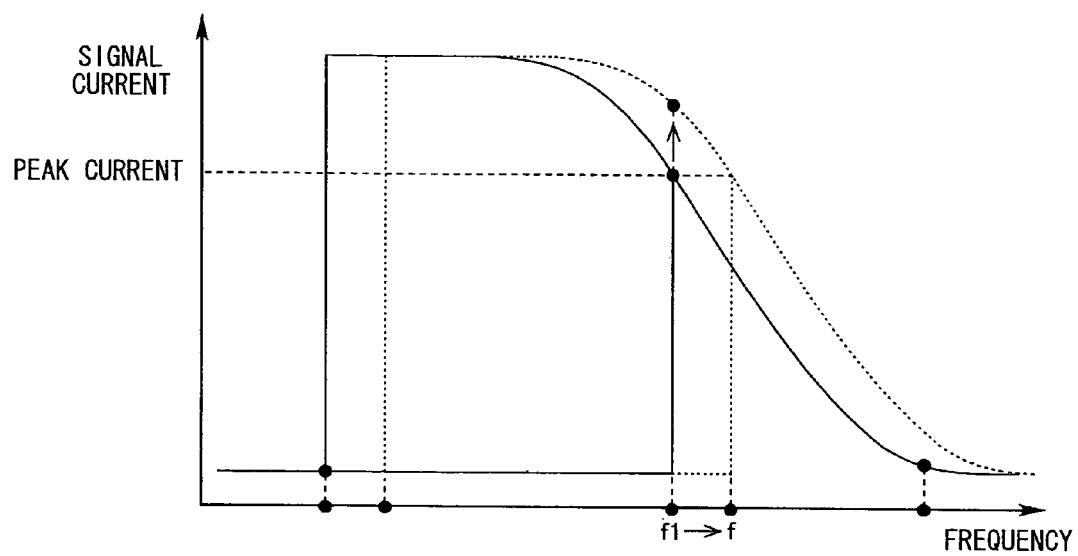
FIGS. 16A and 16B are graphs showing operating characteristics of the piezoelectric motor of the second embodiment.
Figure 16B:
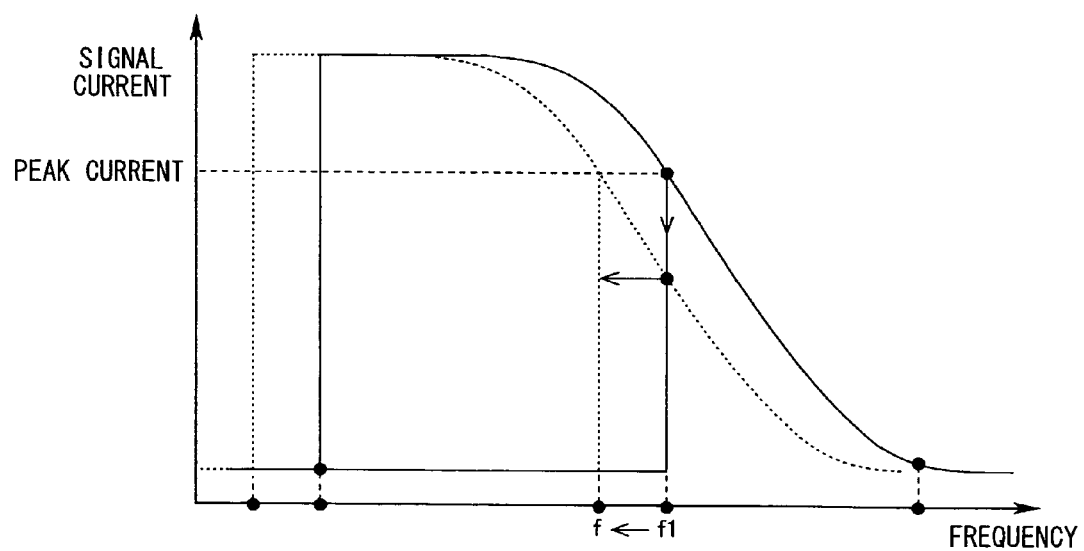

Referring next to FIG. 15, operations of the driver 10 of the second embodiment is described. FIG. 15 is a flowchart of an operational example of the driver 10 of this embodiment. Hereinbelow, the operations are described also with reference to FIG. 16 if necessary. FIGS. 16A and 16B are schematic diagrams showing a change in operating characteristics of the piezoelectric motor driven by the driver 10.

If powered on at the initial stage, the control unit 17 controls the VCO 19 to input a driving signal of initial frequency to the piezoelectric actuator 15 (S101). At this time, the initial frequency is lower than a resonance frequency of a piezoelectric element of the piezoelectric actuator 15. The control unit 17 gradually raises the frequency from the initial frequency level, allowing the VCO 19 to input the driving signal of a predetermined frequency into the piezoelectric actuator 15 (S102). Then, the control unit 17 instructs the piezoelectric actuator 15 to rotate at the set frequency f (S103).

The control unit 17 detects that the piezoelectric actuator 15 is driven based on a current detected by the current detecting unit 16 (S104). To elaborate, the control unit 17 determines that the piezoelectric actuator 15 is not driven if a current value of the detected current from the current detecting unit 16 is approximately 0; otherwise, control unit 17 determines that the piezoelectric actuator 15 is driven.

The control unit 17 raises a frequency until the driving of the piezoelectric actuator 15 is started, and inputs a driving signal to the piezoelectric actuator 15 to record a frequency of the driving signal at a point when the driving is started. More specifically, if determining that the piezoelectric actuator 15 is not driven (S104), the control unit 17 raises a driving signal frequency until the driving of the piezoelectric actuator 15 is started, and inputs the driving signal to the piezoelectric actuator 15. If determining that the piezoelectric actuator 15 is driven (S104), the control unit 17 stores a frequency of the driving signal input at this point as a frequency f1, and a current value detected by the current detecting unit 16 in the memory 18 (S105 and S106).

The current detecting unit 16 detects a current flowing through the piezoelectric actuator 15 even after the driving of the piezoelectric actuator 15 is started and then inputs a current value of the detected current to the control unit 17. Receiving the current value of the detected current from the current detecting unit 16, the control unit 17 temporarily stores this value in the memory 18 (S107). If another current value of detected current is input from the current detecting unit 16, the control unit 17 compares this current value with the previous one stored in the memory 18 (S108 and S111). If this current value is equal to the previous one stored in the memory 18 (S108), the control unit 17 keeps the drive frequency f (S109). Then, the control unit 17 instructs the piezoelectric actuator 15 to rotate at the set frequency f (S110), and the process returns to step S107 where the current detecting unit 16 detects a current flowing through the piezoelectric actuator 15.

If this current value of the detected value is larger than the previous one (S108 and S111), the control unit 17 raises the set frequency f of the driving signal by a predetermined level, for example, about 250 Hz (S112). As shown in FIG. 16A, if this current value of the detected value is larger than the previous one, operating characteristics of the piezoelectric motor are shifted to increase a frequency. Thus, a resonance frequency of the piezoelectric actuator 15 is higher than the prestored resonance frequency f1 due to various factors such as heat generated upon driving. Accordingly, the present frequency f of the driving signal of the driven piezoelectric actuator 15 is close to a step-out frequency, so the frequency f of the driving signal to be input is increased. After that, the control unit 17 instructs the piezoelectric actuator 15 to rotate at the set frequency f (S110), and the process returns to step S107 where the current detecting unit 16 detects current flowing through the piezoelectric actuator 15.

If a current value of the detected current is smaller than the prestored current value (S108 and S111), the control unit 17 lowers the frequency f of the driving signal by a predetermined amount (S113). The control unit 17 compares the lowered frequency of the driving signal with the resonance frequency f1 (S114). If this frequency f of the driving signal is higher than the resonance frequency f1 (S114), the control unit 17 instructs the VCO 19 to rotate at the set frequency f (S110), and the process returns to step S107 where the current detecting unit 16 detects current flowing through the piezoelectric actuator 15.

If the lowered frequency f of the driving signal is not higher than the resonance frequency f1 stored in the memory 18 (S114), the control unit 17 sets the frequency f of the driving signal for driving the piezoelectric actuator 15 as the resonance frequency f1 (S115). After that, the control unit 17 instructs the VCO 19 to rotate at the set frequency f (S110), and the process returns to step S107 where the current detecting unit 16 detects current flowing through the piezoelectric actuator 15.

As shown in FIG. 16B, if the current value of the detected current is equal to or smaller than the stored current value, the operating characteristics of the piezoelectric motor are shifted to lower the frequency. Thus, the resonance frequency of the piezoelectric actuator 15 is lower than the prestored resonance frequency f1 due to various factors such as heat generated upon driving. Accordingly, in order to increase a current value of the driving signal for driving the piezoelectric actuator 15, the frequency f of the driving signal to be input is decreased. At this time, there is a possibility that the frequency f of the driving signal loses synchronization. However, according to the present invention, the frequency f of the driving signal is set to f1 or higher, the frequency f of the driving signal never loses synchronization. Therefore, the piezoelectric actuator 15 can be stably driven.

As described above, in the driver 10 of this embodiment, the driving signal frequency is increased from a lower value at initial power-on to thereby detect a peak current (maximum current value) flowing through the driven piezoelectric actuator 15 and detect a corresponding resonance frequency f1. Hence, the piezoelectric actuator 15 can keep the state driven at the maximum current value in a frequency range higher than the resonance frequency f1. Accordingly, it is possible to drive the actuator in a stable state for a long period without causing a loss of synchronism.

In particular, if a current value of detected current increases, a driving signal frequency is increased. Thus, even if the resonance frequency of the piezoelectric actuator 15 is shifted to increase, it is possible to prevent a loss of synchronism. Likewise, if a current value of detected current is lowered, a driving signal frequency is decreased. Thus, even if the resonance frequency of the piezoelectric actuator 15 is shifted to lower, it is possible to prevent the frequency from reaching a stop point. Accordingly, it is possible to prevent the frequency from reaching any rotation stop points in a frequency range higher than the resonance frequency with reliability.

Further, at initial power-on, a driving signal frequency is gradually increased, and the driving of the piezoelectric actuator 15 is started. Thus, even if a state of the piezoelectric element of the piezoelectric actuator 15 is changed, it is possible to respond to the change and to drive the piezoelectric actuator 15 in the optimum state. Further, a resonance frequency of the piezoelectric actuator 15 at initial power-on is stored, by which the actuator can be driven and operated based on the stored resonance frequency for the second and subsequent times. This enables prompt activation of the motor in response to power-on.

Third Embodiment

An actuator according to a third embodiment of the present invention moves two members using one piezoelectric element. In particular, these two members can be individually driven. This embodiment describes a lens driver to which the actuator is applied by citing a digital camera as a preferred example of the portable device of this embodiment. Further, a preferred example of the lens driver of this embodiment is described taking a lens driver of a camera for individually driving the zoom lens and the autofocus lens as an example. Incidentally, in the following description, the term "zoom" is also abbreviated to "ZM", and the term "autofocus" is also abbreviated to "AF".

Hereinafter, the digital camera of this embodiment is described with reference to the accompanying drawings.

Figure 17:
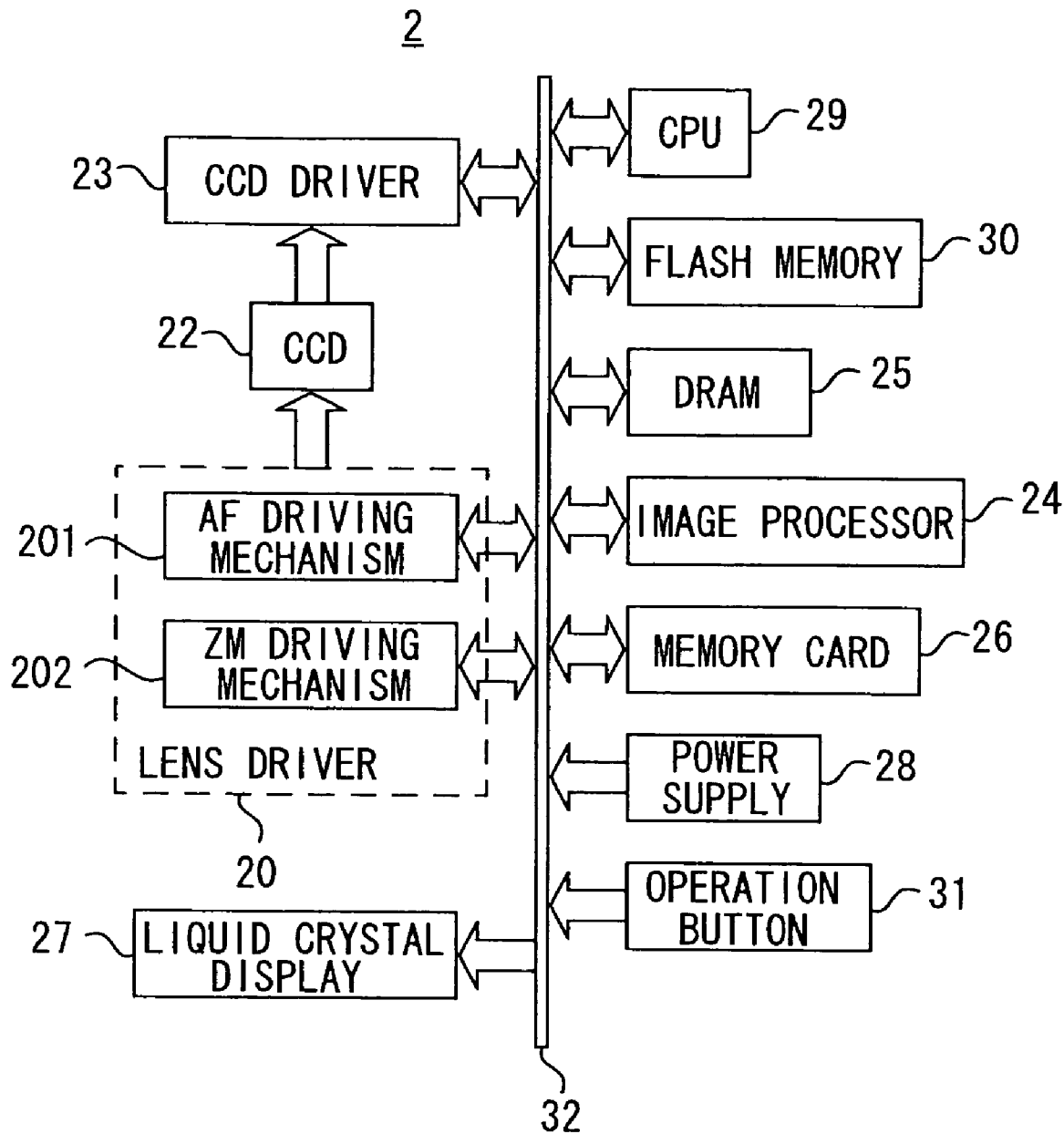
FIG. 17 is a schematic diagram of a structural example of a digital camera according to a third embodiment of the present invention.

Referring to FIG. 17, the schematic structure of a digital camera of the third embodiment is described. FIG. 17 is a block diagram illustrating functions of the digital camera of the third embodiment.

As shown in FIG. 17, a digital camera 2 of the third embodiment includes a lens driver 20, a CCD 22, a CCD driver 23, an image processor 24, a DRAM 25, a memory card 26, a liquid crystal display 27, a power supply 28, a CPU 29, a flash memory 30, an operation button 31, and an internal bus 32.

The lens driver 20 automatically focuses on a subject by means of an AF driving mechanism 201 and adjusts a zoom factor by means of a ZM driving mechanism 202 as described below. The lens driver 20 projects a subject image to the CCD 22 through its optical lens, and the CCD 22 inputs the projected subject image to the CCD driver 23 as a video signal. The CCD driver 23 converts the input video signal into a digital signal through A/D conversion, and inputs the digital signal to the image processor 24. The image processor 24 inputs the received digital signal to the DRAM 25, and temporarily records image data in the DRAM 25.

The image processor 24 reads the temporarily recorded image data from the DRAM 25 and performs image processing such as color correction. The image processor 24 compresses the processed image data and then records the data on the memory card 26 and displays the image data on the liquid crystal display 27. A driving power for these devices is supplied from the power supply 28, and the CPU 29 controls various processings. The CPU 29 reads various programs such as an image processing or compression program and a lens driving program from the flash memory 30, and controls processings of each device in response to data input with the operation button 31. Further, various kinds of data are transferred through the bus 32.

Figure 18:
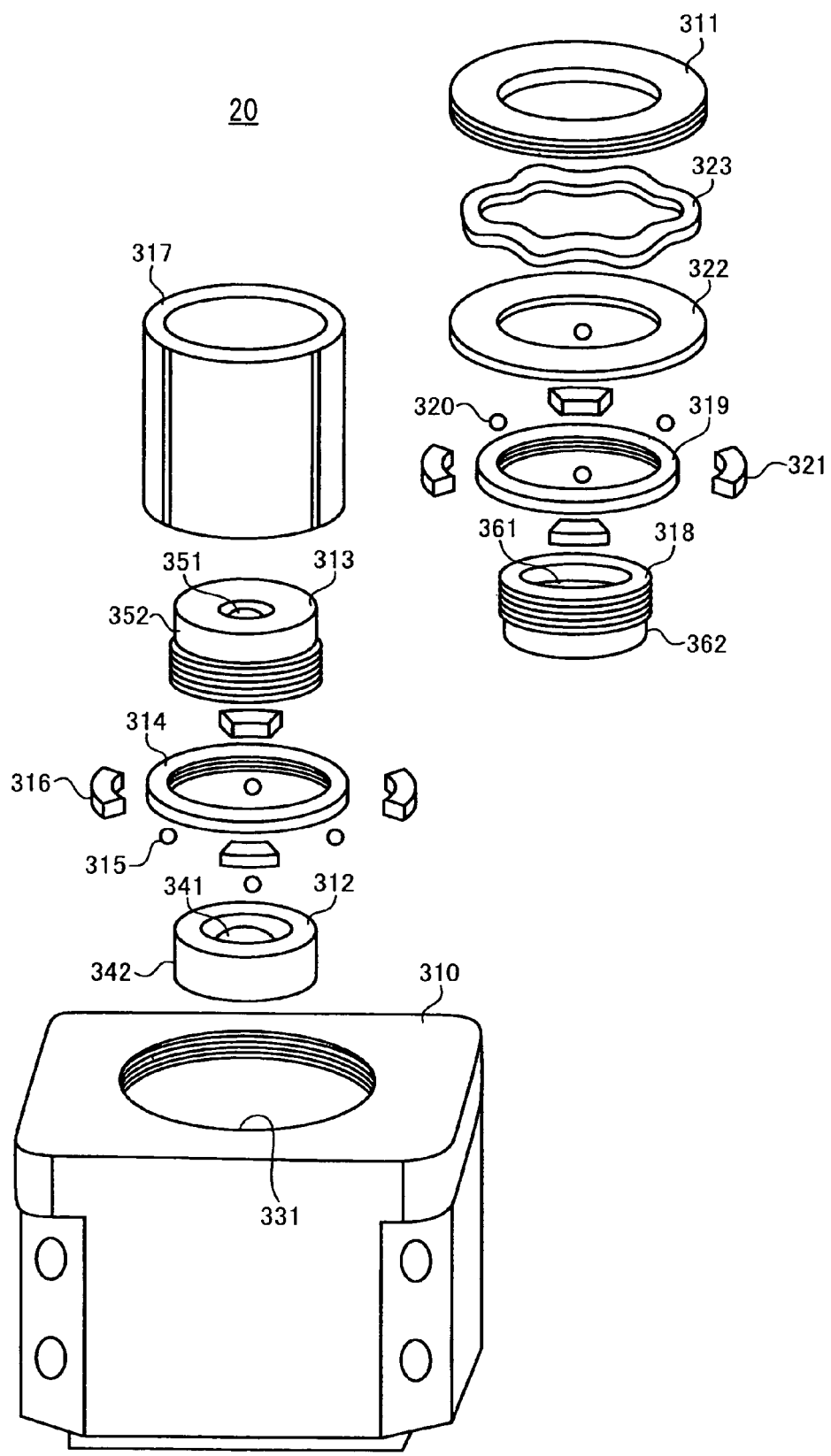
FIG. 18 is an exploded perspective view of an example of an outer appearance of a lens driver according to a third embodiment of the present invention.
Figure 19:
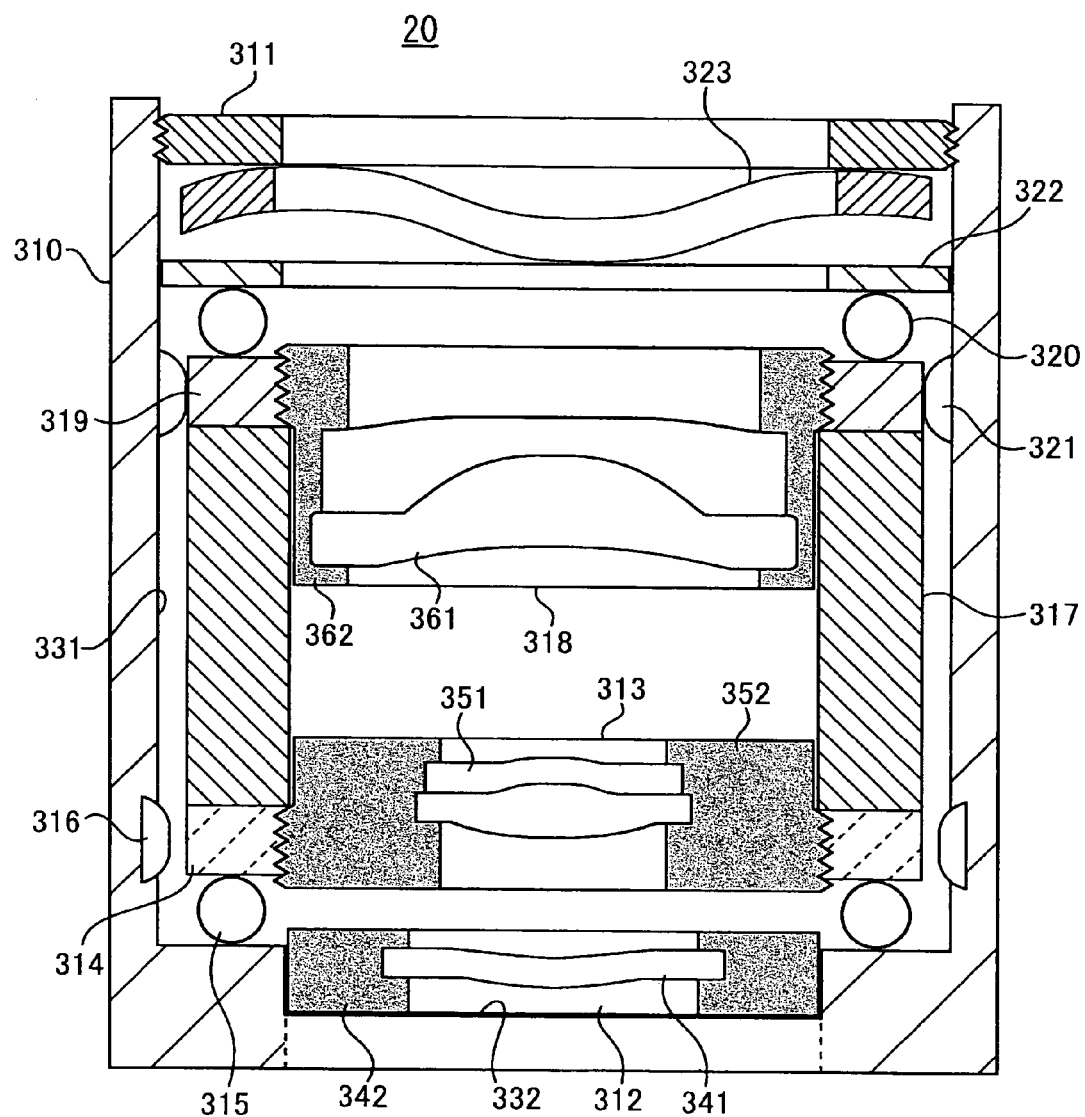
FIG. 19 is a sectional view of a structural example of the lens driver of the third embodiment.

Referring next to FIGS. 18 and 19, a specific structure of the lens driver 20 of the third embodiment is described.

FIG. 18 is an exploded perspective view of the physical structure of the lens driver of the present embodiment. As shown in FIG. 18, the lens driver 20 includes a housing 310, a hold-down lid 311, a fixed lens unit 312, an AF lens unit 313, an AF rotor 314, an AF bearing 315, an AF brake 316, a piezoelectric element 317, a ZM lens unit 318, a ZM rotor 319, a ZM bearing 320, a ZM brake 321, a pressure pad 322, and a pressure spring 323.

The housing 310 is a main part of the case accommodating the members. An accommodating portion 331 is formed in the housing 310. The accommodating portion 331 has, for example, substantially cylindrical shape, and grooves are formed in the upper surface portion of the housing 310. Although not shown, through-holes that allow light to pass therethrough are formed in the bottom of the housing 310.

The hold-down lid 311 is an external cover that closes the accommodating portion 331 of the housing 310, and constitutes the case of the lens driver 20 together with the housing 310. The hold-down lid 311 has substantially the same dimension as the dimension of a sectional shape of the accommodating portion 331. For example, the lid may be a plate member of substantially doughnut shape. The hold-down lid 311 has grooves on its outer periphery.

The fixed lens unit 312 corresponds to a lens unit fixed to the housing 310. The fixed lens unit 312 has substantially cylindrical shape, and is structured such that various optical lenses 341 are molded by a resin portion 342. The resin portion 342 has grooves along its outer periphery.

The AF lens unit 313 corresponds to a lens unit movable in the housing 310, and adjusts the focus of the lens by changing the distance from the fixed lens unit 312. The AF lens unit 313 takes substantially cylindrical shape similar to the fixed lens unit 312, and is structured such that various optical lenses 351 are molded by a resin portion 352. The resin portion 352 has grooves along its outer periphery, and the grooves are partially formed in the outer peripheral portion.

The AF rotor 314 is made up of a metal tube of substantially ring shape, and has substantially the same size as that of a dougnut-like end portion of the piezoelectric element 317 as mentioned below. The AF rotor 314 has grooves along its inner periphery. The AF bearing 315 is a metal member of substantially ball shape, and movably supports the lens in a predetermined direction. The AF brake 316 is a kind of braking unit for braking the AF rotor 314 to halt its rotation, and is formed of, for example, rubber. FIG. 18 shows an example where four AF bearings 315 and four AF brakes 316 are provided. Further, although not shown in FIG. 18, the AF brake 316 is connected with a braking mechanism driving the brake.

The piezoelectric element 317 is a so-called electrostrictive element (piezoelectric actuator 15) which expands and contracts in accordance with an applied voltage. The piezoelectric element 317 generates drive force for driving the lens driver 20. Similar to the first and second embodiment, the piezoelectric element 317 has substantially cylindrical shape, and grooves are formed in its longitudinal direction to section the element off into four portions as described below. The four sections are applied with an alternating voltage a polarity of which periodically switches between positive and negative polarities. As a result, the piezoelectric element 317 is excited to a resonant state, and generates a revolving torque.

The ZM lens unit 318 corresponds to a lens unit movable in the housing 310 similar to the AF lens unit 313, and changes a focal distance by adjusting the distance from the fixed lens unit 312. The ZM lens unit 318 is also structured such that various optical lenses 361 are molded by a resin portion 362 similar to the fixed lens unit 312, and has substantially cylindrical shape. The resin portion 362 has grooves along its outer periphery, and the grooves are partially formed in the outer peripheral portion.

Similar to the AF rotor 314, the ZM rotor 319 is made up of a metal tube of substantially ring shape, and has substantially the same dimension as that of a doughnut-like end portion of the piezoelectric element 317. The ZM rotor 319 has grooves along its inner periphery. The ZM bearing 320 is a metal member of substantially ball shape and movably supports the lens in a predetermined direction similar to the AF bearing 315. The ZM brake 321 is a kind of braking unit for braking the ZM rotor 319 to halt its rotation similar to the AF brake 316, and is formed of, for example, rubber. FIG. 18 shows an example where four ZM bearings 320 and four ZM brakes 321 are provided. Although not shown in FIG. 18, the ZM brake 321 is connected with a braking mechanism driving the brake.

The pressure pad 322 functions as an inner lid in contrast to the hold-down lid 311 as the outer lid. For example, the pressure pad 322 has substantially the same dimension as that of the hold-down lid 311, and may be a plate member of substantially doughnut shape. The pressure spring 323 is a kind of elastic units that transmit elastic force, and has substantially doughnut shape. The spring is, for example, a plate spring such as a corrugated washer.

FIG. 19 is a sectional view of the overall structure of the lens driver 20 of the present embodiment.

As shown in FIG. 19, the fixed lens unit 312 is fixed to the bottom portion of the accommodating portion 331 in the housing 310. To be specific, the resin portion 342 of the fixed lens unit 312 is fitted into a recess 332 formed at the bottom of the accommodating portion 331. At this time, the fixed lens unit 312 is fixed so that the optical axis of the optical lens 341 extends in the longitudinal direction of the accommodating portion 331. The AF bearings 315 are placed around the recess 332, in other words, surround the fixed lens unit 312. The AF rotor 314 is placed on the AF bearings 315. At this time, the AF rotor 314 is held rotatably in its outer circumferential direction by the AF bearings 315.

The piezoelectric element 317 is placed on the AF rotor 314 and brought into contact with the AF rotor 314. That is, the AF rotor 314 is provided slidably on the piezoelectric element 317. The AF lens unit 313 is attached in such a manner as to screw into/unscrew from the inner portion of the AF rotor 314. More specifically, the grooves of the resin portion 352 of the AF lens unit 313 are engaged with the grooves of the inner periphery of the AF rotor 314 and fastened down. At the same time, the AF lens unit 313 is inserted to the inner portion of the piezoelectric element 317. Thus, the piezoelectric element 317 functions as a lens barrel of the AF lens unit 313. The AF lens unit 313 is fixed so that the optical axis of the optical lens 351 extends in the longitudinal direction of the piezoelectric element 317.

The AF brakes 316 are movably attached to the housing 310, and surround the AF rotor 314. More specifically, the AF brakes 316 are arranged around the AF rotor 314 such that the brakes can come into contact with the AF rotor 314 while protruding from the housing 310.

As described above, the AF lens unit 313, the AF rotor 314, the AF bearing 315, the AF brake 316, and the piezoelectric element 317 constitute the AF driving mechanism 201. The ZM driving mechanism 202 includes the piezoelectric element 317, the ZM lens unit 318, the ZM rotor 319, the ZM bearing 320, and the ZM brake 321 similar to the AF driving mechanism 201. In particular, the driving mechanisms 201 and 202 share the piezoelectric element 317. To be specific, the ZM driving mechanism 202 and the AF driving mechanism 201 are arranged opposite to each other with respect to the vertical direction as follows.

The ZM rotor 319 is placed on the piezoelectric element 317 and brought into contact with the piezoelectric element 317. That is, the ZM rotor 319 is attached slidably on the piezoelectric element 317. The grooves of the resin portion 362 of the ZM lens unit 318 are engaged with grooves on the inner periphery of the ZM rotor 319 and accordingly fitted into the piezoelectric element 317. Thus, the piezoelectric element 317 functions as a lens barrel of the ZM lens unit 318 as well. Under this condition, the ZM lens unit 318 opposes the AF lens unit 313 and is fixed such that the optical axis of the optical lens 361 extends in the longitudinal direction of the piezoelectric element 317. The ZM bearings 320 are placed on the ZM rotor 319, and the ZM rotor 319 is held rotatably in its outer circumferential direction by the ZM bearings 320.

The ZM brakes 321 are movably attached to the housing 310. The ZM brakes 321 surround the ZM rotor 319, and are arranged around the ZM rotor 319. At this time, the ZM brakes 321 are provided so as to come into contact with the ZM rotor 319 while protruding from the housing 310.

The pressure pad 322 is placed on the ZM bearing 320, and the pressure spring 323 is provided on the pressure pad 322. The hold-down lid 311 is put on the pressure spring 323, and spirally engaged with grooves formed in the inner wall of the accommodating portion 331. At this time, the hold-down lid 311 is fastened to the grooves of the accommodating portion 331 to keep the pressure spring 323 pressed against the pressure pad 322. Accordingly, the pressure spring 323 presses the pressure pad 322, and the pressure pad 322 transmits the elastic force from the pressure spring 323 to the ZM bearings 320 to press the ZM rotor 319.

If pressed by the ZM bearings 320, the ZM rotor 319 presses the piezoelectric element 317 using the pressing force. Accordingly, the ZM rotor 319 is brought into pressure contact with the piezoelectric element 317. The piezoelectric element 317, in turn, presses the AF rotor 314, so the AF rotor 314 is brought into pressure contact with the piezoelectric element 317. The AF rotor 314 is supported by the AF bearing 315 on the bottom of the housing 310. In this way, the hold-down lid 311 is attached to the housing 310 to pressurize individual members in the accommodating portion 331 between the pressure pad 322 and the bottom of the accommodating portion 331 to keep the members in pressure contact.

Figure 20:
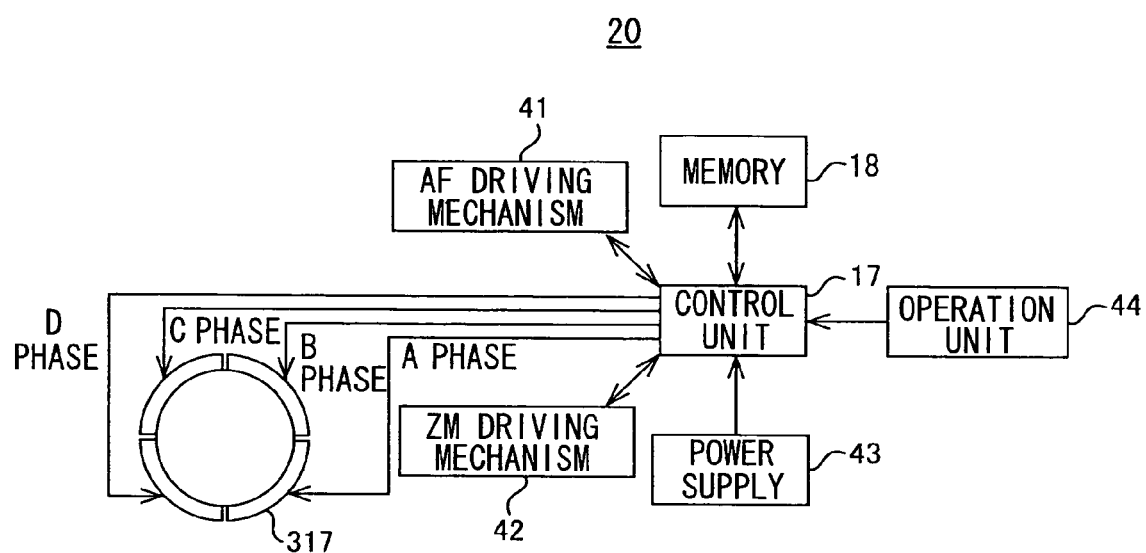
FIG. 20 is a schematic diagram of an example of the internal structure of the lens driver of the third embodiment.

Subsequently, referring to FIG. 20, the internal structure of the lens driver 20 of this embodiment is described. FIG. 20 is a schematic diagram showing the internal structure of the lens driver 20 of this embodiment.

As shown in FIG. 20, the lens driver 20 includes an AF lens driving unit 41, a ZM lens driving unit 42, a power supply unit 43, an operating unit 44, a memory 18, a control unit 17, and a piezoelectric element 317.

The AF lens driving unit 41 includes the AF lens unit 313, the AF rotor 314, and the AF brake 316, and has a function of driving the AF lens unit 313. The ZM lens driving unit 42 includes the ZM lens unit 318, the ZM rotor 319, and the ZM brake 321, and has a function of driving the ZM lens unit 318.

The power supply unit 43 includes the power supply 28 of the digital camera 2, and has a function of supplying power. The operating unit 44 includes various operation buttons of the digital camera 2, and has a function of controlling various operations of the lens driver 20.

The memory 18 includes the DRAM 25 and the flash memory 30 of the digital camera 2, and has a function of storing programs or data necessary for various processings of the lens driver 20. To be specific, the memory 18 stores programs necessary for controlling focusing of the AF lens unit 313 and controlling focal distance adjustment of the ZM lens unit 318, and data used therefor. More specifically, as an example of the stored data, the memory stores data about movement distances of the lens units 313 and 318 in association with data about the rpm of the rotors 314 and 319, and stores data about a drive voltage of the piezoelectric element 317 in association with the data about the rpm of the rotors 314 and 319.

The control unit 17 has a function of controlling various processings of the lens driver 20, for example, the CPU 29 or image processor 24 of the digital camera 2. The control unit 17 is electrically connected with each of the four divided portions of the piezoelectric element 317. At this time, the four divided portions of the piezoelectric element 317 are connected in parallel, and the control unit 17 also functions as a switching unit for switchingly applies a voltage to each of the four divided portions of the piezoelectric element 317.

Next, description is given of how the lens driver 20 of this embodiment drives the lens.

To begin with, the driving mechanism of the lens driver 20 is described appropriately referring to FIGS. 18 and 19.

In the initial state where the lens driver 20 is not driven, the ZM brake 321 is in contact with the ZM rotor 319. The AF brakes 316 are also brought into contact with the AF rotor 314 in the initial state. Thus, both of the rotors 314 and 319 are fixed to the piezoelectric element 317 not to rotate in the outer circumferential direction. At this time, both of the rotors 314 and 319 are brought into pressure contact with the piezoelectric element 317 and thus fixed in the longitudinal direction of the piezoelectric element 317. Accordingly, both of the rotors 314 and 319 are secured not to move between the piezoelectric element 317 and both of the bearings 315 and 320. At the same time, the piezoelectric element 317 is secured between the rotors 314 and 319, and the lens units 313 and 318 are also fixed to the piezoelectric element 317.

When the lens driver 20 is driven to adjust the focus of a lens, the AF lens unit 313 moves for positional adjustment. To be specific, the AF brakes 316 cancel the protruding state and are retracted, so the AF rotor 314 can rotate. In contrast, the ZM brakes 321 are held protruding and brought into contact with the ZM rotor 319. Therefore, the ZM rotor 319 cannot be rotated with respect to the piezoelectric element 317. At this time, the ZM rotor 319 is brought into pressure contact with the piezoelectric element 317 and thus secured between the piezoelectric element 317 and the ZM bearing 320. Accordingly, if the AF lens unit 313 is moved, the ZM rotor 319 functions as the stator 11 together with the piezoelectric element 317.

As described below in detail, the piezoelectric element 317 rotates the AF rotor 314 under this state. The AF rotor 314 is rotated thereby with respect to the AF lens unit 313 as well. At this time, the AF rotor 314 is secured between the piezoelectric element 317 and the AF bearing 315 in the longitudinal direction (optical axis direction). On the other hand, the AF lens unit 313 is screwed to the AF rotor 314. Therefore, the torque of the AF rotor 314 is turned into linear drive force, and the AF lens unit 313 is linearly moved in the longitudinal direction of the piezoelectric element 317. As a result, the distance from the fixed lens unit 312 is adjusted to obtain focusing. After the completion of focusing, the AF brakes 316 protrude from the housing 310 and the AF rotor 314 comes into contact with the AF lens unit 313. As a result, the AF lens unit 313 returns to the initial state where the unit cannot rotate.

Also in the case where the lens driver 20 is driven to adjust the focal distance, similar to the AF lens unit 313, the ZM lens unit 318 is moved and its positional alignment is carried out. To be specific, the ZM brakes 321 cancel the protruding state and thus retract, and the ZM rotor 319 can rotate. In contrast, the AF brakes 316 are held protruding, and brought into contact with the AF rotor 314. Therefore, the AF rotor 314 cannot be rotated with respect to the piezoelectric element 317. At this time, the AF rotor 314 is secured between the piezoelectric element 317 and the AF bearing 315. Accordingly, if the ZM lens unit 318 is moved, the AF rotor 314 functions as the stator 11 together with the piezoelectric element 317.

The piezoelectric element 317 rotates the ZM rotor 319 under this state. The ZM rotor 319 is rotated thereby with respect to the ZM lens unit 318 as well. At this time, the ZM rotor 319 is secured between the piezoelectric element 317 and the ZM bearing 320. The ZM lens unit 318 is screwed to the ZM rotor 319. Thus, the torque of the ZM rotor 319 is turned into linear drive force, and the ZM lens unit 318 linearly moves in the longitudinal direction of the piezoelectric element 317. As a result, the distance from the fixed lens unit 312 is controlled to adjust the focal distance. After the completion of adjusting the focal distance, the ZM brakes 321 protrude from the housing 310, and the ZM rotor 319 comes into contact with the ZM lens unit 318. Thus, the ZM lens unit 318 returns to the initial state where the unit cannot rotate.

Subsequently, description is made of how the lens driver 20 drives the piezoelectric element 317 appropriately referring to FIG. 20.

The control unit 17 starts operating by power supplied from the power supply unit 43. In response to power supply, the control unit 17 reads various programs or data from the memory 18 and switches to a standby mode. When a user manipulates the operating unit 44, a signal input through this manipulation is output to the control unit 17. In response to this signal, the control unit 17 outputs various control signals to the lens driving units 41 and 42, and the piezoelectric element 317.

Figure 4:
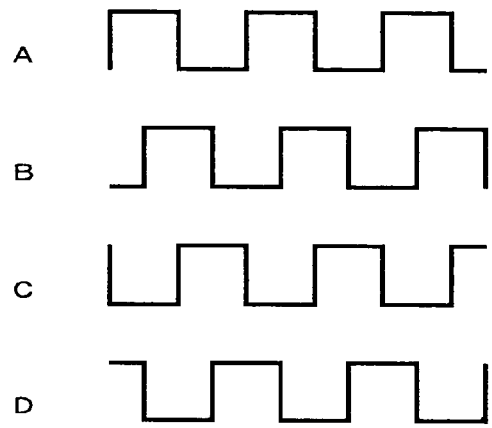
FIG. 4 is a waveform diagram of driving signals for driving an ultrasonic motor of the related art.
Figure 5:
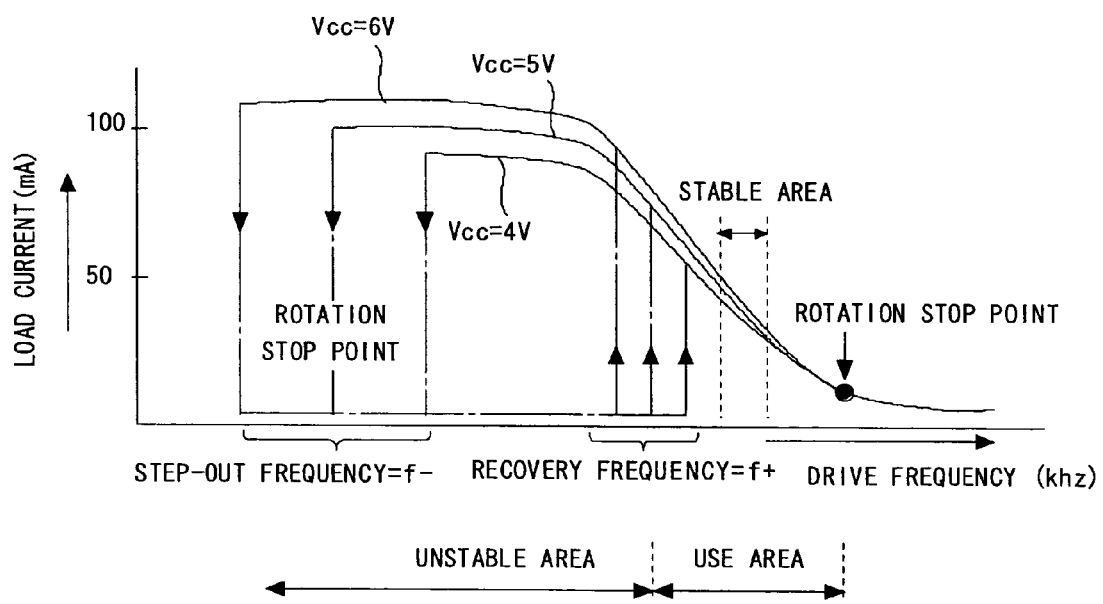
FIG. 5 is a graph showing a relation between a load current and a drive frequency in an ultrasonic motor of the related art.
Figure 6:
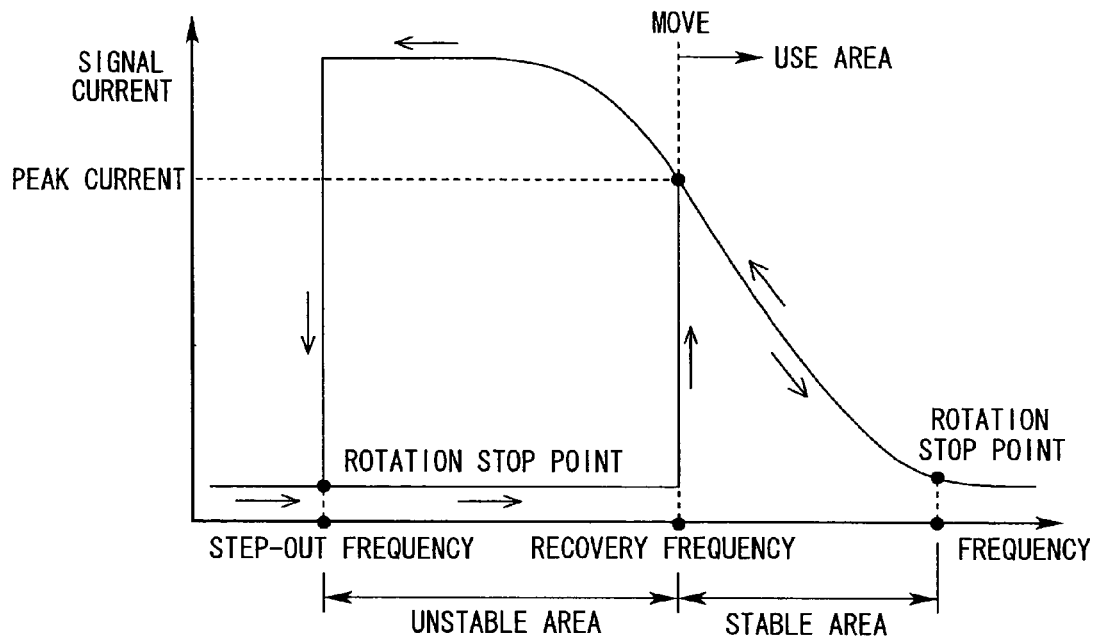
FIG. 6 is a graph showing operating characteristics of an ultrasonic motor of the related art.
Figure 7:
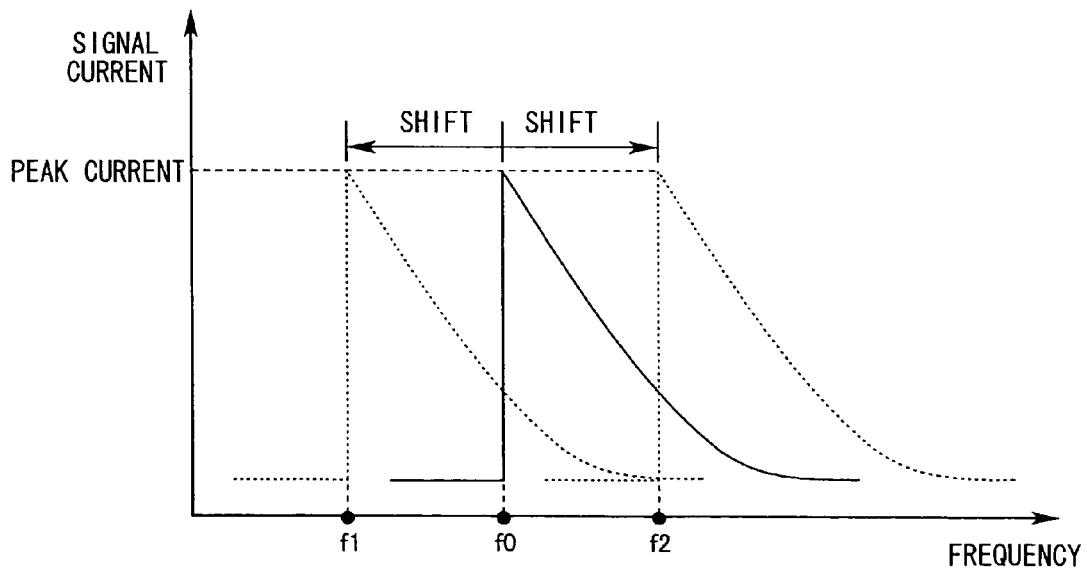
FIG. 7 is a graph showing operating characteristics of an ultrasonic motor of the related art.

To be specific, in the case of driving the AF lens unit 313, the control unit 17 inputs an AF brake control signal for controlling an operation of the AF brake 316 to the AF lens driving unit 41. The AF lens driving unit 41 retracts the AF brake 316 that is being in contact with the AF rotor 314 and cancels this contact state based on the received AF brake control signal. At the same time, the control unit 17 applies drive voltage to the piezoelectric element 317. A waveform example of the drive voltage applied to the piezoelectric element 317 is shown in a waveform diagram of FIG. 4 as in the first and second embodiments.

Applying four alternating voltages the phases of which are shifted from one another by 90° to the piezoelectric element 317 causes different revolving vibrations in four divided portions of the piezoelectric element 317. More specifically, similar revolving vibrations are generated in a pair of adjacent portions to rotate the pair of portions. Since the AF rotor 314 is brought into pressure contact with the piezoelectric element 317, resonance occurs so that the center of gravity of the AF rotor 314 moves around the center of the end portion of the piezoelectric element 317. As a result, a rotational torque is generated in the AF rotor 314, and the rotor is revolved eccentrically like a hula-hoop with respect to the piezoelectric element 317. The AF lens driving unit 41 excites and rotates the AF rotor 314 in this way, and spirally moves the AF lens unit 313.

Also in the case of driving the ZM lens unit 318, the control unit 17 drives the ZM lens driving unit 42 similar to the AF lens driving unit 41. To be specific, the control unit 17 inputs a ZM brake control signal for controlling an operation of the ZM brake 321 to the ZM lens driving unit 42. At the same time, the control unit 17 applies four alternating voltages out of phase to the piezoelectric element 317 similar to the AF lens driving unit 41. Thus, the ZM lens driving unit 42 rotates the ZM lens unit 318 and spirally moves the ZM lens unit 318.

As described above, the digital camera 2 of this embodiment includes the lens driver 20 individually driving the two lens units 313 and 318 using one piezoelectric element 317. Since only one piezoelectric element 317 drives the lens units 313 and 318, a compact and inexpensive lens driver 20 is realized. Therefore, it is also possible to downsize the digital camera 2 including such lens driver 20, and reduce its cost.

Incidentally, the above embodiments describe the lens driver that drives the two lens units 313 and 318 while displacing these units. However, the present invention is not limited thereto, and the actuator of the embodiments is applicable to a device that rotates the rotors 314 and 319 without attaching any members to the rotors 314 and 319 and linearly moving these rotors. The term "displacing and driving the members" specified in the embodiments refers to rotating the members as well as linearly moving the members.

From the invention thus described, it will be obvious that the embodiments of the maybe varied in many ways. Such variations are not to be regarded as a departure from the spirit and scope of the invention, and all such modifications as would be obvious to one skilled in the art are intended for inclusion within the scope of the following claims.

What is claimed is:

1. A driver for driving an ultrasonic actuator including a piezoelectric actuator including a piezoelectric element and generating a driving force in accordance with a driving signal having consecutive pulses, and a movable element converting the driving force into actual movement, comprising:
- a memory storing a driving start frequency at which driving of the piezoelectric actuator is started;
- a current detecting unit detecting a current flowing through the piezoelectric actuator; and
- a control unit controlling a frequency of a driving signal input to the piezoelectric actuator,
- the control unit controlling a frequency of the driving signal in accordance with the current detected with the current detecting unit in a frequency band equal to or higher than the driving start frequency.

2. The driver for driving an ultrasonic actuator according to claim 1, wherein the control unit increases a frequency of the driving signal input to the piezoelectric actuator if an amount of the detected current increases, and decreases the frequency of the driving signal input to the piezoelectric actuator if an amount of the detected current decreases.

3. The driver for driving an ultrasonic actuator according to claim 2, wherein the control unit inputs a driving signal to the piezoelectric actuator while increasing a frequency of the driving signal upon power-on of the ultrasonic actuator, and stores the driving start frequency at which driving of the piezoelectric actuator is started in the memory.

4. An ultrasonic actuator driven with the driver according to claim 2.

5. A driving method of an ultrasonic actuator including a piezoelectric actuator including a piezoelectric element and generating a driving force in accordance with a driving signal having consecutive pulses, and a movable element converting the driving force into actual movement, comprising:
- storing a driving start frequency at which driving of the piezoelectric actuator is started;
- detecting a current flowing through the piezoelectric actuator; and
- controlling a frequency of the driving signal in accordance with the detected current at a frequency band equal to or higher than the driving start frequency.

6. The driving method of an ultrasonic actuator according to claim 5, wherein the controlling of the frequency of the driving signal includes:
- increasing a frequency of the driving signal input to the piezoelectric actuator if an amount of the detected current increases; and
- decreasing a frequency of the driving signal input to the piezoelectric actuator if an amount of the detected current decreases.

7. The driving method of an ultrasonic actuator according to claim 5, further comprising:
- turning on the ultrasonic actuator;
- inputting a driving signal to the piezoelectric actuator upon the power-on while increasing a frequency of the driving signal; and
- storing the driving start frequency at which driving of the piezoelectric actuator is started.

* * * * *